(12) United States Patent
Hahm et al.

(10) Patent No.: US 7,894,508 B2
(45) Date of Patent: Feb. 22, 2011

(54) WCDMA TERMINAL BASEBAND PROCESSING MODULE HAVING CELL SEARCHER MODULE

(75) Inventors: Mark David Hahm, Hartland, WI (US); Li Fung Chang, Holmdel, NJ (US); Nelson R. Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 1443 days.

(21) Appl. No.: 11/221,145

(22) Filed: Sep. 6, 2005

(65) Prior Publication Data

US 2007/0025428 A1 Feb. 1, 2007

Related U.S. Application Data

(63) Continuation-in-part of application No. 10/228,165, filed on Aug. 26, 2002.

(60) Provisional application No. 60/315,377, filed on Aug. 27, 2001, provisional application No. 60/703,209, filed on Jul. 28, 2005.

(51) Int. Cl.
*H04B 1/00* (2006.01)
(52) U.S. Cl. .................. 375/150; 375/137; 375/356
(58) Field of Classification Search .................. 375/130, 375/136–137, 140–147, 149, 354, 356
See application file for complete search history.

(56) References Cited

U.S. PATENT DOCUMENTS 6,363,060 B1 * 3/2002 Sarkar ..................... 370/342

7,308,017 B2 12/2007 Jiang et al.
7,443,826 B1 * 10/2008 Atarius et al. ............. 370/342
7,447,179 B2 * 11/2008 Lu ............................ 370/335

(Continued)

FOREIGN PATENT DOCUMENTS

CN 1315792 10/2001

(Continued)

OTHER PUBLICATIONS

ETSI Technical Report; "UMTS Terrestrial Radio Access Concept Evaluation"; Dec. 1997; XP002109765 (pp. 47-48).

(Continued)

*Primary Examiner*—David C Payne
*Assistant Examiner*—James M Perez
(74) *Attorney, Agent, or Firm*—Garlick Harrison & Markison; Bruce E. Garlick

(57) ABSTRACT

A baseband processing module includes TX processing components, a processor, memory, an RX interface, and a cell searcher module. The TX processing components receive outbound data, process the outbound data to produce a baseband TX signal, and output the baseband TX signal to a RF front end of the RF transceiver. The RX interface receives a baseband RX signal from the RF front end carrying a WCDMA signal. The cell searcher module receives the baseband RX signal, scans for WCDMA energy within the baseband RX signal, acquires slot synchronization to the WCDMA signal based upon correlation with a Primary Synchronization Channel (PSCH) of the WCDMA signal, acquires frame synchronization to, and identify a code group of, the WCDMA signal based upon correlation with a Secondary Synchronization Channel (SSCH) of the WCDMA signal, and identifies the scrambling code of the WCDMA signal based upon correlation with a Common Pilot Channel (CPICH) of the WCDMA signal.

12 Claims, 18 Drawing Sheets

U.S. PATENT DOCUMENTS

| | | |
|---|---|---|
| 2003/0039228 A1* | 2/2003 | Shiu et al. .................... 370/331 |
| 2003/0043768 A1* | 3/2003 | Chang et al. ................ 370/335 |
| 2003/0202541 A1* | 10/2003 | Lim et al. .................... 370/503 |
| 2004/0250049 A1 | 12/2004 | Becker et al. |
| 2006/0239380 A1* | 10/2006 | Khlat et al. ................. 375/297 |
| 2008/0205556 A1* | 8/2008 | Wang ......................... 375/340 |

FOREIGN PATENT DOCUMENTS

| | | |
|---|---|---|
| CN | 1318920 | 10/2001 |
| EP | 1 289 163 A2 | 3/2003 |
| WO | 03/069793 A1 | 8/2003 |

OTHER PUBLICATIONS

Harju, et al., "Flexible Implementation of a WCDMA Rake Receiver", IEEE Workshop on Signal Processing Systems, 2002 (SIPS '02), Oct. 16-18, 2002, pp. 177-182.

Harju, et al., "Flexible Implementation of a WCDMA Rake Receiver", The Journal of VLSI Signal Processing, Dec. 7, 2004, pp. 147-160, vol. 39.

Harju, et al., "A Baseband Receiver Architecture for UMTS-WLAN Interworking Applications", IEEE Ninth International Symposium on Proceedings Computers and Communications, Jun. 28-Jul. 1, 2004, pp. 678-685.

* cited by examiner

WCDMA TERMINAL BASEBAND PROCESSING MODULE HAVING CELL SEARCHER MODULE

CROSS REFERENCES TO RELATED APPLICATIONS

This application is a continuation-in-part of U.S. Utility application Ser. No. 10/228,165, filed on Aug. 26, 2002, which claims priority to U.S. Provisional Application No. 60/315,377, filed Aug. 27, 2001. This application claims priority to U.S. Provisional Patent Application Ser. No. 60/703,209, filed Jul. 28, 2005, which is incorporated herein by reference for all purposes.

BACKGROUND

1. Technical Field

The present invention relates generally to wireless communication systems; and more particularly to the decoding of data communications received by a wireless terminal in such a wireless communication system.

2. Related Art

Cellular wireless communication systems support wireless communication services in many populated areas of the world. Cellular wireless communication systems include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its serviced cell/sectors. A BSC coupled to the base station routes voice communications between the MSC and the serving base station. The MSC routes the voice communication to another MSC or to the PSTN. BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced, and torn down. Popular currently employed cellular standards include the Global System for Mobile telecommunications (GSM) standards, the North American Code Division Multiple Access (CDMA) standards, and the North American Time Division Multiple Access (TDMA) standards, among others. These operating standards support both voice communications and data communications. More recently introduced operating standards include the Universal Mobile Telecommunications Services (UMTS)/Wideband CDMA (WCDMA) standards. The UMTS/WCDMA standard employs CDMA principles and support high throughput, both voice and data. As contrasted to the North American CDMA standard, transmissions within a UMTS/WCDMA system are not aligned to a timing reference, i.e., GPS timing reference. Thus, synchronization to a base station by a wireless terminal is more complicated in a WCDMA system than in a North American CDMA system. Cell searching, base station identification, and base station synchronization consumes significant processing resources. Such continuous operations can overload a baseband processor causing degradation of performance and decrease battery life.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
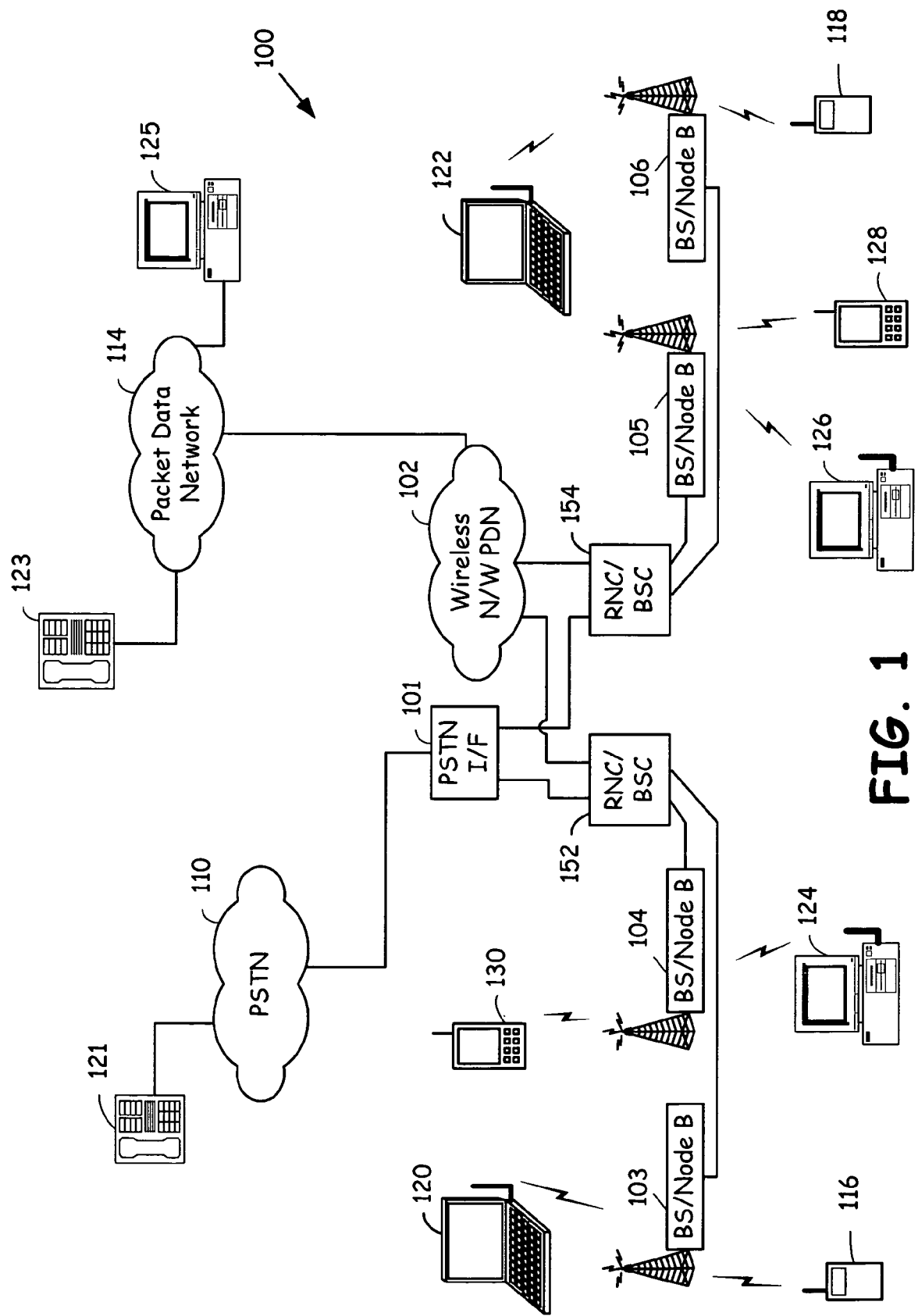
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Public Switched Telephone Network (PSTN) Interface 101, e.g., Mobile Switching Center, a wireless network packet data network 102 that includes GPRS Support Nodes, EDGE Support Nodes, WCDMA Support Nodes, and other components, Radio Network Controllers/Base Station Controllers (RNC/BSCs) 152 and 154, and base stations/node Bs 103, 104, 105, and 106. The wireless network packet data network 102 couples to additional private and public packet data networks 114, e.g., the Internet, WANs, LANs, etc. A conventional voice terminal 121 couples to the PSTN 110. A Voice over Internet Protocol (VoIP) terminal 123 and a personal computer 125 couple to the Internet/WAN 114. The PSTN Interface 101 couples to the PSTN 110. Of course, this particular structure may vary from system to system.

Each of the base stations/node Bs 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc.

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the EDGE operating standard, the GPRS standard, the UMTS/WCDMA standard, and/or the GSM standard.

Figure 2:
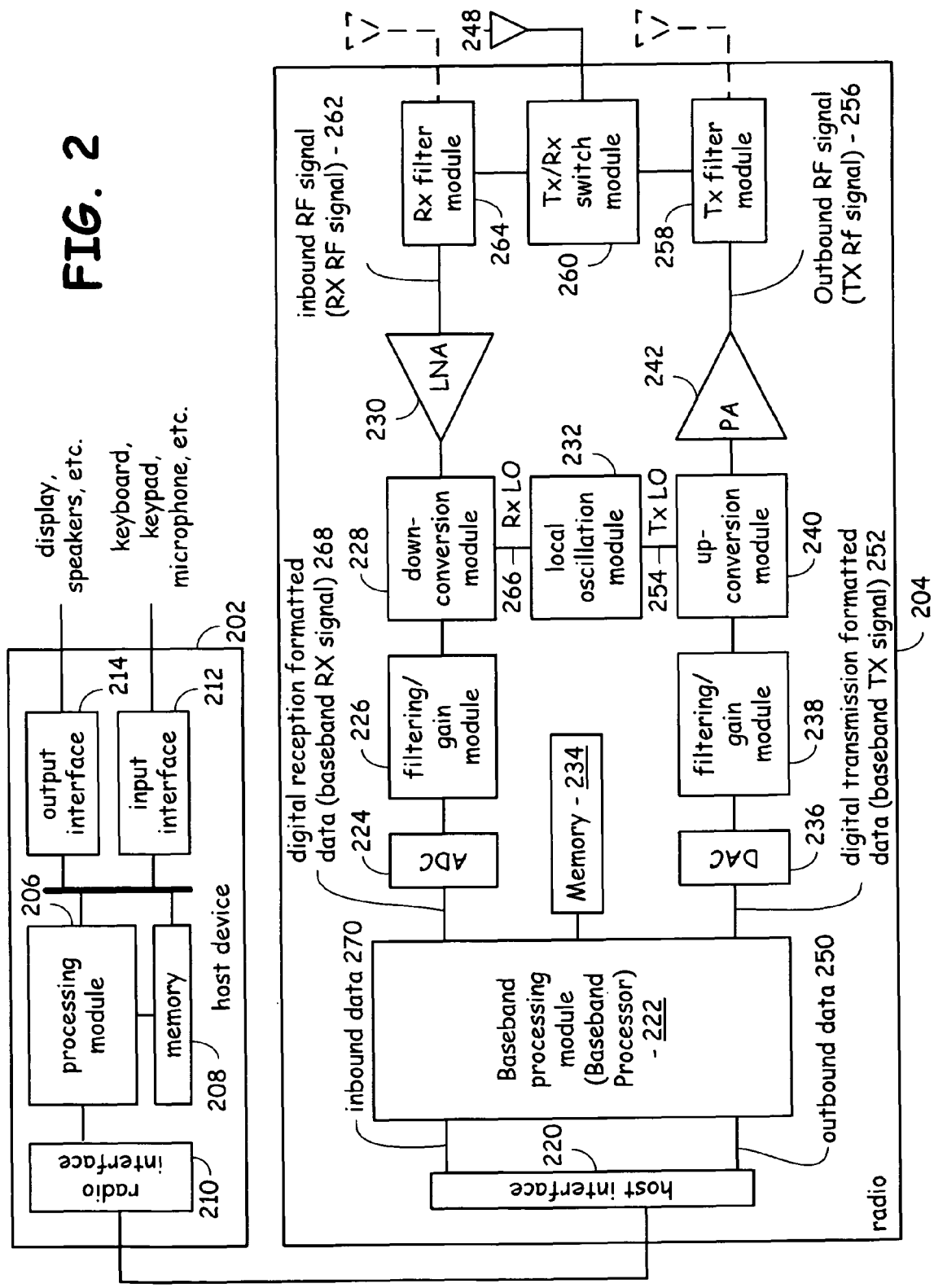
FIG. 2 is a block diagram functionally illustrating a wireless terminal constructed according to the present invention.

FIG. 2 is a schematic block diagram illustrating a wireless terminal that includes host processing components 202 and an associated radio 204. For cellular telephones, the host processing components and the radio 204 are contained within a single housing. In some cellular telephones, the host processing components 202 and some or all of the components of the radio 204 are formed on a single Integrated Circuit (IC). For personal digital assistants hosts, laptop hosts, and/or personal computer hosts, the radio 204 may reside within an expansion card and, therefore, reside be house separately from the host processing components 202. The host processing components 202 include at least a processing module 206, memory 208, radio interface 210, an input interface 212, and an output interface 214. The processing module 206 and memory 208 execute instructions to support host terminal functions. For example, for a cellular telephone host device, the processing module 206 performs user interface operations and executes host software programs among other operations.

The radio interface 210 allows data to be received from and sent to the radio 204. For data received from the radio 204 (e.g., inbound data), the radio interface 210 provides the data to the processing module 206 for further processing and/or routing to the output interface 214. The output interface 214 provides connectivity to an output display device such as a display, monitor, speakers, et cetera such that the received data may be displayed. The radio interface 210 also provides data from the processing module 206 to the radio 204. The processing module 206 may receive the outbound data from an input device such as a keyboard, keypad, microphone, et cetera via the input interface 212 or generate the data itself. For data received via the input interface 212, the processing module 206 may perform a corresponding host function on the data and/or route it to the radio 204 via the radio interface 210.

Radio 204 includes a host interface 220, baseband processing module 222 (baseband processor) 222, analog-to-digital converter 224, filtering/gain module 226, down conversion module 228, low noise amplifier 230, local oscillation module 232, memory 234, digital-to-analog converter 236, filtering/gain module 238, up-conversion module 240, power amplifier 242, RX filter module 264, TX filter module 258, TX/RX switch module 260, and antenna 248. Antenna 248 may be a single antenna that is shared by transmit and receive paths (half-duplex) or may include separate antennas for the transmit path and receive path (full-duplex). The antenna implementation will depend on the particular standard to which the wireless communication device is compliant.

The baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by the baseband processing module 222 may be implemented using shared processing devices and/or individual processing devices. Processing devices may include microprocessors, microcontrollers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. The memory 234 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 222 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 204 receives outbound data 250 from the host processing components via the host interface 220. The host interface 220 routes the outbound data 250 to the baseband processing module 222, which processes the outbound data 250 in accordance with a particular wireless communication standard (e.g., UMTS/WCDMA, GSM, GPRS, EDGE, et cetera) to produce digital transmission formatted data 252. The digital transmission formatted data 252 is a digital base-band signal or a digital low IF signal, where the low IF will be in the frequency range of zero to a few kilohertz/megahertz.

The digital-to-analog converter 236 converts the digital transmission formatted data 252 from the digital domain to the analog domain. The filtering/gain module 238 filters and/or adjusts the gain of the analog signal prior to providing it to the up-conversion module 240. The up-conversion module 240 directly converts the analog baseband or low IF signal into an RF signal based on a transmitter local oscillation 254 provided by local oscillation module 232. The power amplifier 242 amplifies the RF signal to produce outbound RF signal 256, which is filtered by the TX filter module 258. The TX/RX switch module 260 receives the amplified and filtered RF signal from the TX filter module 258 and provides the output RF signal 256 signal to the antenna 248, which transmits the outbound RF signal 256 to a targeted device such as a base station 103-106.

The radio 204 also receives an inbound RF signal 262, which was transmitted by a base station via the antenna 248, the TX/RX switch module 260, and the RX filter module 264. The low noise amplifier 230 receives inbound RF signal 262 and amplifies the inbound RF signal 262 to produce an amplified inbound RF signal. The low noise amplifier 230 provides the amplified inbound RF signal to the down conversion module 228, which converts the amplified inbound RF signal into an inbound low IF signal or baseband signal based on a receiver local oscillation 266 provided by local oscillation module 232. The down conversion module 228 provides the inbound low IF signal (or baseband signal) to the filtering/gain module 226, which filters and/or adjusts the gain of the signal before providing it to the analog to digital converter 224. The analog-to-digital converter 224 converts the filtered inbound low IF signal (or baseband signal) from the analog domain to the digital domain to produce digital reception formatted data 268. The baseband processing module 222 demodulates, demaps, descrambles, and/or decodes the digital reception formatted data 268 to recapture inbound data 270 in accordance with the particular wireless communication standard being implemented by radio 204. The host interface 220 provides the recaptured inbound data 270 to the host processing components 202 via the radio interface 210.

Figure 3:
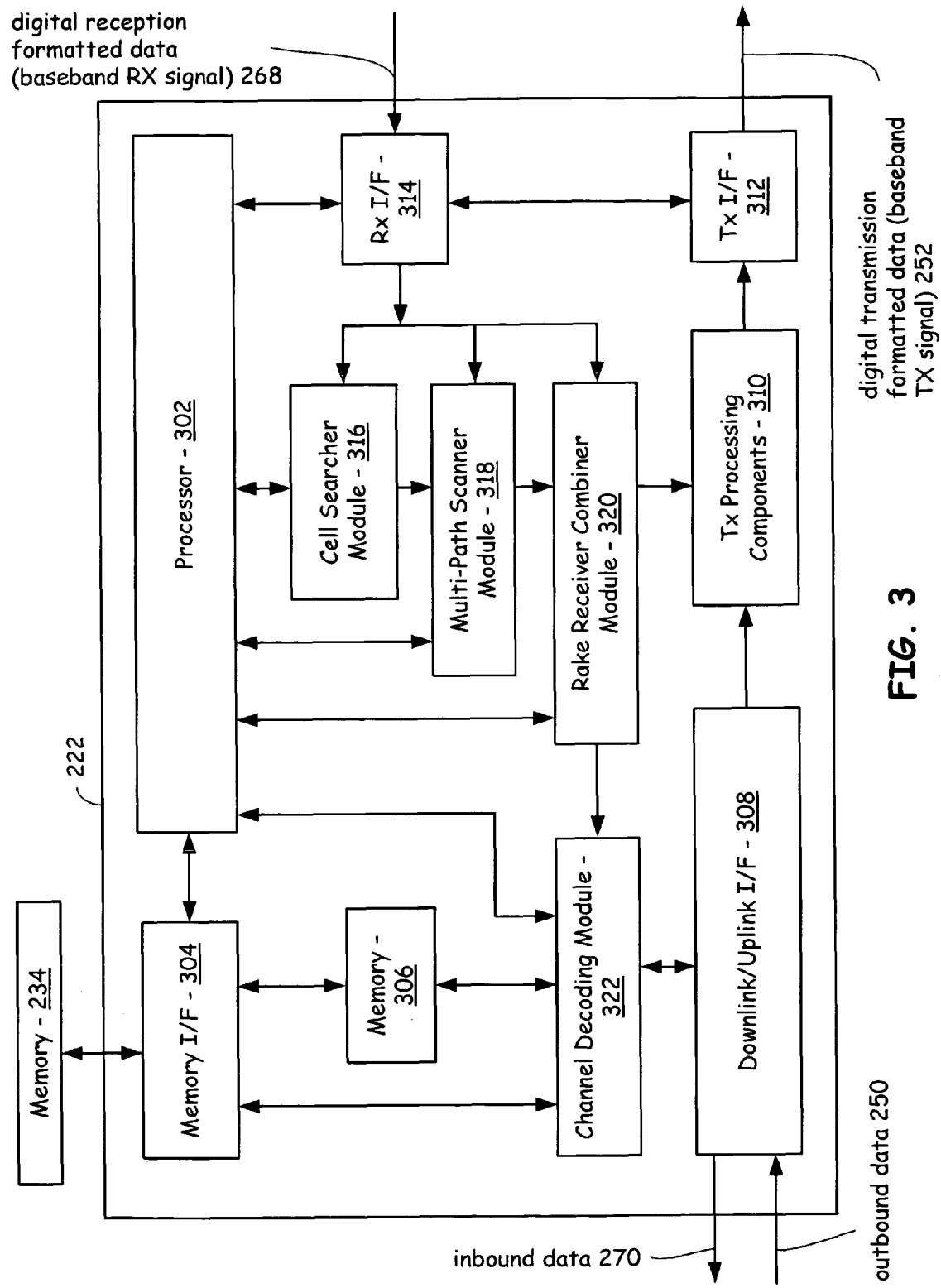
FIG. 3 is a block diagram illustrating components of a baseband processing module according to an embodiment of the present invention.

FIG. 3 is a block diagram illustrating components of a baseband processing module 222 according to an embodiment of the present invention. Components of baseband processing module 222 (baseband processor) 222 include a processor 302, a memory interface 304, onboard memory 306, a downlink/uplink interface 308, TX processing components 310, and a TX interface 312. The baseband processing module 222 further includes an RX interface 314, a cell searcher module 316, a multi-path scanner module 318, a rake receiver combiner module 320, and a channel decoding module 322. The baseband processing module 222 couples in some embodiments to external memory 234. However, in other embodiments, memory 306 services the memory requirements if the baseband processing module 222 302.

As was previously described with reference to FIG. 2, the baseband processing module 222 receives outbound data 250 from coupled host processing components 202 and provides inbound data 270 to the coupled host processing components 202. The baseband processing module 222 provides digital formatted transmission data (baseband TX signal) 252 to a coupled RF front end. The baseband processing module 222 receives digital reception formatted data (baseband RX signal) 268 from the coupled RF front end. As was previously described with reference to FIG. 2, an ADC 222 produces the digital reception formatted data (baseband RX data) 268 while the DAC 236 of the RF front end receives the digital transmission formatted data (baseband TX signal) 252 from the baseband processing module 222.

The downlink/uplink interface 308 is operable to receive the outbound data 250 from coupled host processing components, e.g., the host processing component 202 via host interface 220. The downlink/uplink interface 308 is operable to provide inbound data 270 to the coupled host processing components 202 via the host interface 220. As the reader will appreciate, the baseband processing module 222 may be formed on a single integrated circuit with the other components of radio 204. Alternately, the radio 204 (including the baseband processing module 222) may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, the baseband processing module 222 and the host processing components 202 may be formed on a separate integrated circuit. Many differing constructs integrated circuit constructs are possible without departing from the teachings of the present invention. TX processing component 310 and TX interface 312 communicatively couple to the RF front end as illustrated in FIG. 2 and to the downlink/uplink interface 308. The TX processing components 310 and TX interface 312 are operable to receive the outbound data from the downlink/uplink interface 304, to process the outbound data to produce the baseband TX signal 252 and to output the baseband TX signal 252 to the RF front end as was described with reference to FIG. 2.

Figure 4A:
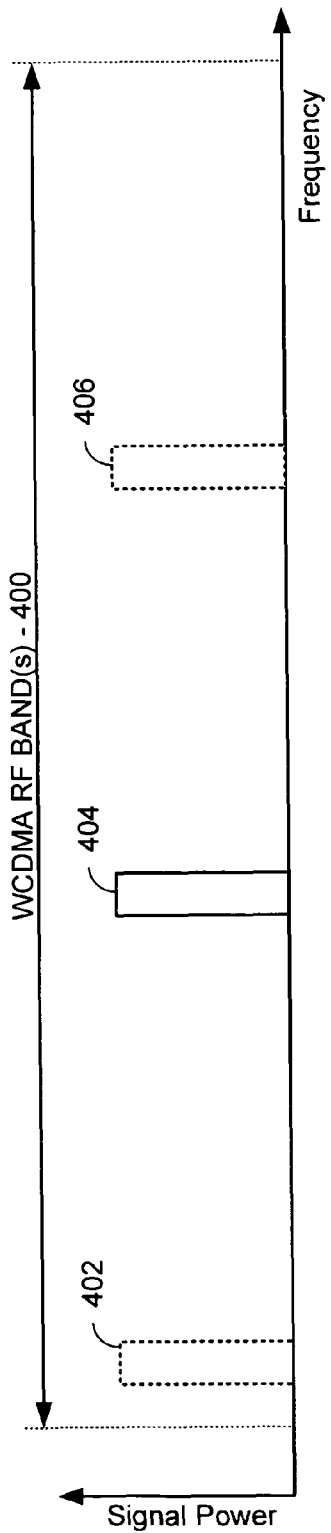
FIG. 4A is a graph illustrating diagrammatically the power spectral density of WCDMA RF band(s) supporting multiple RF carriers.

FIG. 4A is a graph illustrating diagrammatically the power spectral density of WCDMA RF band(s) 400 supporting multiple RF carriers 402, 404, and 406. The WCDMA RF band(s) 400 extend across a frequency spectrum and include WCDMA RF carriers 402, 404, and 406. According to one aspect of the present invention, the cell searcher module 316 of the baseband processing module 222 of an RF transceiver that supports WCDMA operations according to the present invention is operable to scan the WCDMA RF band(s) 400 to identify WCDMA RF energy of at least one WCDMA carrier 402, 404, or 406. During initial cell search operations, the cell searcher module 316 will, in combination with other components of the baseband processing module 222, identify a strongest WCDMA carrier, e.g., 404. Then, the cell searcher module 316 synchronizes to WCDMA signals within the WCDMA carrier 404. These WCDMA signals corresponding to a particular base station cell or sector. In these initial cell search synchronization operations, the cell searcher module 316 preferably synchronizes to a strongest cell/sector.

WCDMA signals transmitted from multiple base stations/sectors may use a common WCDMA RF carrier 404. Alternately, the WCDMA signals from differing base stations/sectors may use differing WCDMA carriers, e.g., 402 or 406. According to the present invention, the cell searcher module 316 and the baseband processing module 222 are operable to synchronize to WCDMA signals from differing cells/sectors operating in one or more of the WCDMA RF bands 402, 404, or 406. Such synchronization operations occur not only for initial cell search but for neighbor cell search or detected cell search operations.

Figure 4B:
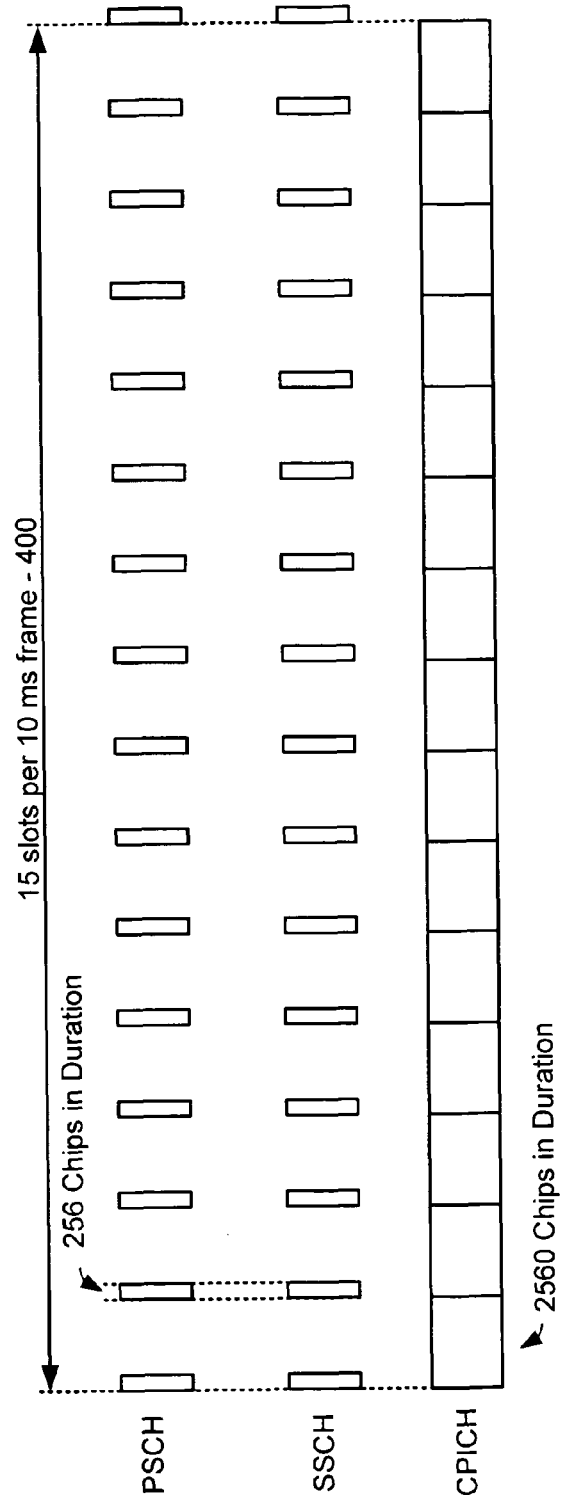
FIG. 4B is a block diagram diagrammatically illustrating the timing of various channels of a WCDMA system employed for cell searching and base station synchronization according to the present invention.

FIG. 4B is a block diagram diagrammatically illustrating the timing of various channels of a WCDMA system employed for cell searching and base station synchronization according to the present invention. The WCDMA signal illustrated has a 15 slot frame structure that extends across 10 ms in time. The WCDMA signal includes a Synchronization Channel (SCH) and a Common Pilot Channel (CPICH), which are introduced in the downlink to assist wireless transceivers in performing cell search operations. The SCH is further split into a primary SCH (PSCH) and a secondary SCH (SSCH). The PSCH carries a primary synchronization code (PSC) which is chosen to have good periodic auto correlation properties and the secondary SCH (SSCH) carries a secondary synchronization code (SSC). The PSCH and the SSCH are constructed such that their cyclic-shifts are unique so that reliable slot and frame synchronization can be achieved. The PSCH and the SSCH are 256-chips long with special formats and appear ¹⁄₁₀ of each time slot. The rest of time slot is Common Control Physical Channel (CCPCH). As shown in FIG. 4A, the PSCH and the SSCH are transmitted once in the same position in every slot. The PSCH code is the same for all time slots, and therefore is used to detect slot boundary. The SSCH is used to identify scrambling code group and frame boundary. Thus, the SSCH sequences vary from slot to slot and are coded by a code-book with 64 code-words (each representing a code-group). The CPICH carries pre-defined symbols with a fixed rate (30 kbps, hence 10 symbols per time slot) and spreading factor of 256. The channelization code for CPICH is fixed to the $0^{th}$ code.

According to the present invention, the cell searcher module 316 of the baseband processing module 222 of a WCDMA RF transceiver are operable to: (1) scan for WCDMA energy within a baseband RX signal received at the RX interface corresponding to the WCDMA signal; (2) acquire a slot synchronization to the WCDMA signal based upon correlation with the PSCH of the WCDMA signal; (3) acquire frame synchronization to, and identify a code group of, the received WCDMA signal based upon correlation with the SSCH of the WCDMA signal; and (4) identify the scrambling code of the WCDMA signal based upon correlation with the CPICH of the WCDMA signal.

Figure 5A:
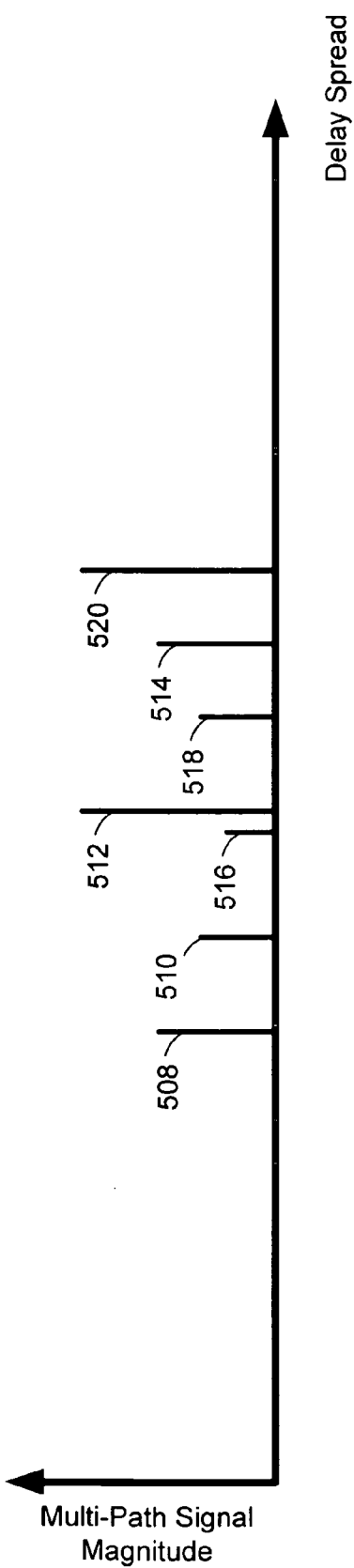
FIG. 5A is a graph illustrating an example of a multi-path delay spread at a first time.

FIG. 5A is a graph illustrating an example of a multi-path delay spread at a first time, T1. As is known, in wireless communication systems, a transmitted signal may take various routes in propagating from an RF transmitter to an RF receiver. Referring briefly again to FIG. 1, transmissions from base station 103 to wireless terminal 116 may take multiple paths with each of these multiple paths arriving in a corresponding time frame. These multiple received copies of the transmitted signal are typically referred to as "multi-path" signal components. Referring again to FIG. 5A, an example of a delay spread that includes multi-path components and their corresponding signal strength for time T1 is shown.

Serving cell signal components 504 include multi-path components 508, 510, 512, and 514 that are received at respective times with respect to a periodic reference time. Neighbor cell signal components 506 include multi-path signal components 516, 518, and 520. Note that the serving cell signal components 504 and neighbor cell signal components arrive at differing times with respect to the periodic reference time since they are not time aligned. As is known, multi-path components of the propagation channel results in signal arrive at the RF receiver at different times. As is also known, the number of received multi-path components and the signal strength and signal to interference ratio of each multi-path component varies over time.

Figure 5B:
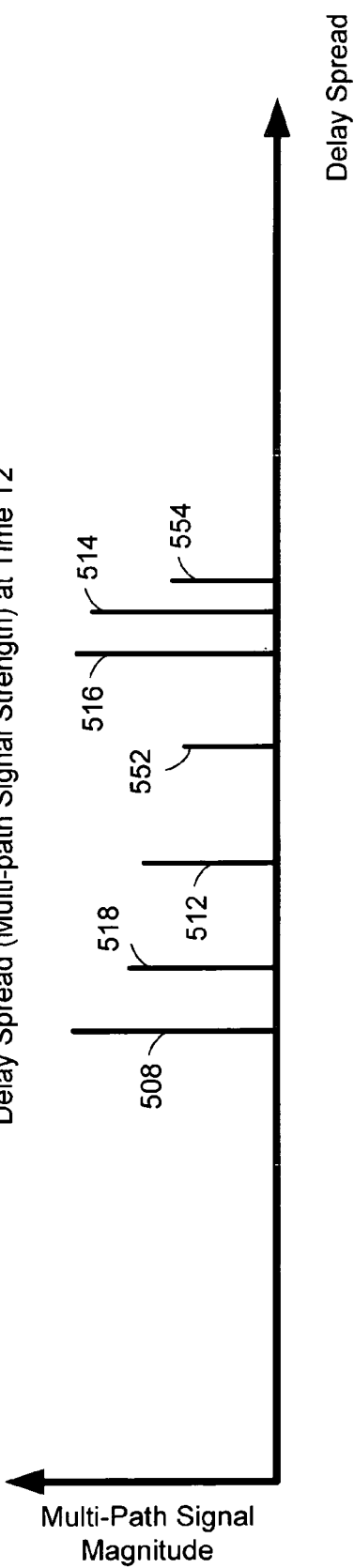
FIG. 5B is a graph illustrating the example of the multi-path delay spread of FIG. 5B at a second time.

FIG. 5B is a graph illustrating the example of the multi-path delay spread of FIG. 5A at a second time, T2. Because the characteristics of the channel from the RF transmitter to the RF receiver changes over time so does serving cell path signal components 504 and neighbor cell signal components 506. Thus, for example, the multi-path component 508 of FIG. 5B, while having the same time relationship to the periodic reference time as multi-path component 508 as shown in FIG. 5A, has a greater signal-to-interference ratio or signal-to-noise ratio than it did in FIG. 5A. Further, multi-path component 510 is missing, multi-path component 512 is smaller in magnitude, and multi-path component 514 is greater in magnitude than are their counterparts of FIG. 5B. In addition, serving cell signal components 504 include a new multi-path component 552 that is existent at time T2 but it was not existent at time T1.

The neighbor cell multi-path signal component 506 at time T2 of FIG. 5B also differ from those at time T1 of FIG. 5A. In such case, multi-path components 516 and 518 have differing magnitudes at time T2 than they did at time T1. Further, multi-path component 520 which was strong at time T1 does not exist at time T2. Moreover, new multi-path component 554 at time T2 exists where it did not exist at time T1. The cell searcher module 316, multi-path scanner module 318, and rake receiver module 320 track the existence of these multi-path components, synchronize to some of these multi-path components, and receive data via at least some of these multi-path components.

Figure 6:
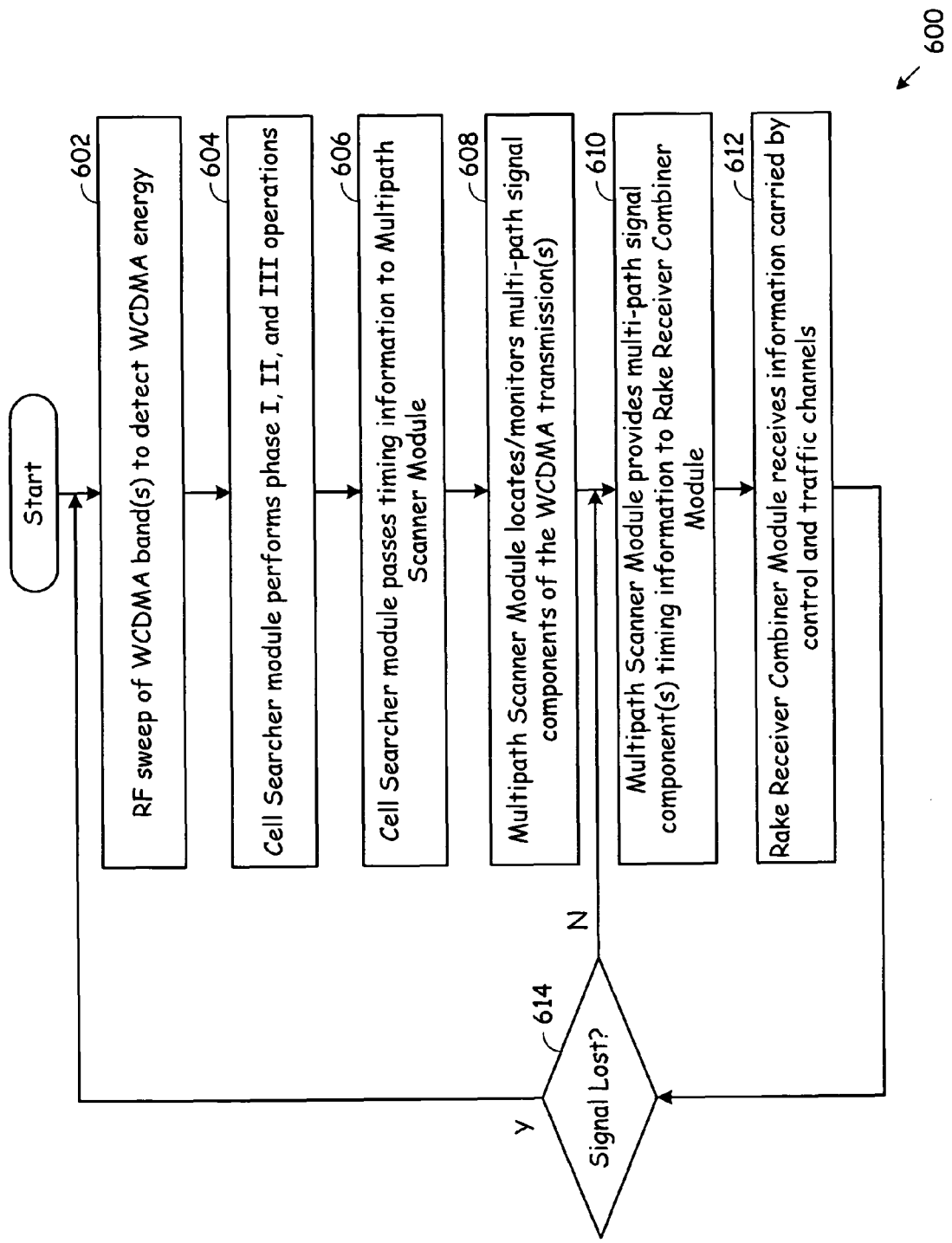
FIG. 6 is a flow chart illustrating operations of a wireless terminal in searching for, finding, synchronizing to, and receiving data from a base station according to an embodiment of the present invention.

FIG. 6 is a flow chart illustrating operations of a wireless terminal in searching for, finding, synchronizing to, and receiving data from a base station according to an embodiment of the present invention. The operations 600 of FIG. 6 are performed by the cell searcher module 316, the multi-path scanner module 318, and the rake receiver module 320 of the baseband processing module 222 of the radio 204 of a wireless terminal constructed according to the present invention. The operations 600 are initiated upon start-up or reset or when the RF terminal is otherwise detecting a serving cell within a WCDMA system. Operation commences with the RF transceiver performing an RF sweep of WCDMA RF bands to detect WCDMA energy (Step 602). The RF sweep of the WCDMA RF bands is a collective effort between the RF front-end components of the RF transceiver radio 204 shown in FIG. 2 as well as the baseband processing module 222 of the radio 204 of FIG. 2. Referring to FIG. 6 and FIG. 3 jointly, in making the RF sweep of the WCDMA RF bands to detect WCDMA energy, the RF front-end tunes to various RF channels within the WCDMA RF bands 400 as shown and discussed with reference to FIG. 4A. With particular references to the components of the baseband processing module 222, the cell searcher module 316 may interact with the processor 302 in order to detect WCDMA energy during the RF sweep of the WCDMA RF bands.

After this RF sweep has been completed at Step 602, the processor 302, in cooperation with the cell searcher module 316 and the RF front-end components, identifies a particular RF band, e.g., 404 of FIG. 4A, in which to detect and synchronize to a WCDMA signal. The cell searcher module 316 of the baseband processing module 222 performs Phase I, Phase II, and Phase III operations in an initial cell search operations (Step 604). In performing its initial cell search operations, the cell searcher module 316 acquires slot synchronization to the WCDMA signal based upon correlation with the PSCH of the WCDMA signal in its Phase I operations. Then, in the Phase II operation, the cell searcher module 316 acquires frame synchronization to, and identifies a code group of, the received WCDMA signal based upon correlation with the SSCH of the WCDMA signal. Then, in its Phase III operations, the cell searcher module 316 identifies the scrambling code of the WCDMA signal based upon correlation with the CPICH of the WCDMA signal. The manner in which the Phase I, II, and III operations of the cell searcher module 316 are performed, and the structured used thereby, will be described more fully with reference to FIGS. 7-18 described herein hereafter. The results of the Phase I, II, and III operations performed by the cell searcher module 316 yield timing information regarding at least one multi-path signal component of the WCDMA signal. In one embodiment, the Phase I, II, and III operations yield timing information and the scrambling code of a strongest multipath component of a WCDMA signal of the selected WCDMA RF carrier.

Operation continues with the cell searcher module 316 passing the timing and scrambling code information to the multi-path scanner module 318 (Step 606). This information may be passed directly or via the processor 302. The multi-path scanner module 318 then locates and monitors multi-path signal components of the WCDMA transmissions (Step 608). The multi-path scanner module 318 then provides the multi-path component timing information to the rake receiver combiner module 320 (Step 610). This information may be passed directly or via the processor 302. The rake receiver combiner module 320 then receives information carried by control and traffic channels of the WCDMA signal of the serving cell/sector (Step 612). The RF transceiver continues to receive control and traffic channel information from a serving cell until it decides to either find a new serving cell via neighbor search operations, it loses the signal from the serving cell, or upon another operational determination in which it decides to either terminate receipt of the signal from the serving cell or the carrier is lost. When the signal is lost (Step 614) or in another situation which the RF transceiver decides to move to a different RF carrier, operation proceeds again to Step 602. However, if the RF transceiver determines that continued operation of the particular RF carrier and for the particular serving cell should continue, operation continues to Step 610 again.

Figure 7:
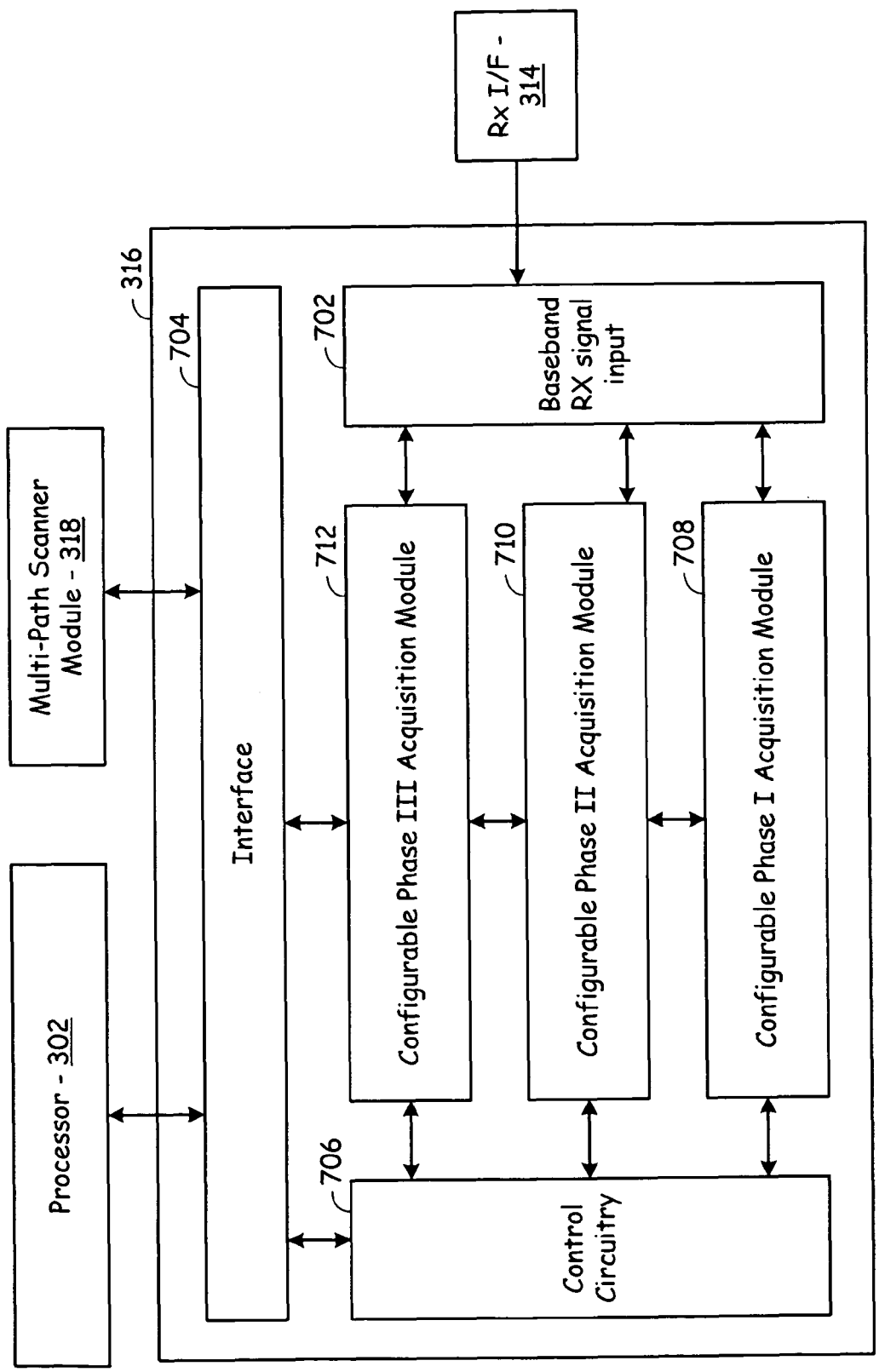
FIG. 7 is a block diagram illustrating a first embodiment of a cell searcher module according to an embodiment of the present.

FIG. 7 is a block diagram illustrating a first embodiment of a cell searcher module 316 according to an embodiment of the present invention. The cell searcher module 316 couples to processor 302, to multi-path scanner module 318, and to RX interface 314. The multi-path scanner module 318 includes a baseband RX signal input 702 that couples to RX interface 314, an interface 704 that couples to processor 302 and multi-path scanner module 318, and control circuitry 706.

The cell searcher module 316 further includes a Phase I acquisition module that is operable to acquire slot synchronization to the received WCDMA signal based upon correlation with the PSCH of the WCDMA signal. Particular embodiments of the structure of the configurable Phase I acquisition module 708 will be described further with reference to FIGS. 10, 11, and 12. The cell searcher module 316 further includes a configurable Phase II acquisition module 710 that is operable to acquire frame synchronization to, and identify the code group of, the received WCDMA signal based upon correlation with the SSCH. The structure of particular embodiments of the configurable Phase II acquisition module 710 will be described further with reference to FIGS. 13 and 14. Finally, the cell searcher module 316 includes a configurable Phase III acquisition module 712 that is operable to identify the scrambling code of the WCDMA signal based upon correlation with the CPICH of the WCDMA signal. The structure of particular embodiments of the Phase III acquisition module 712 will be described further with reference to FIGS. 15-18.

Figure 8:
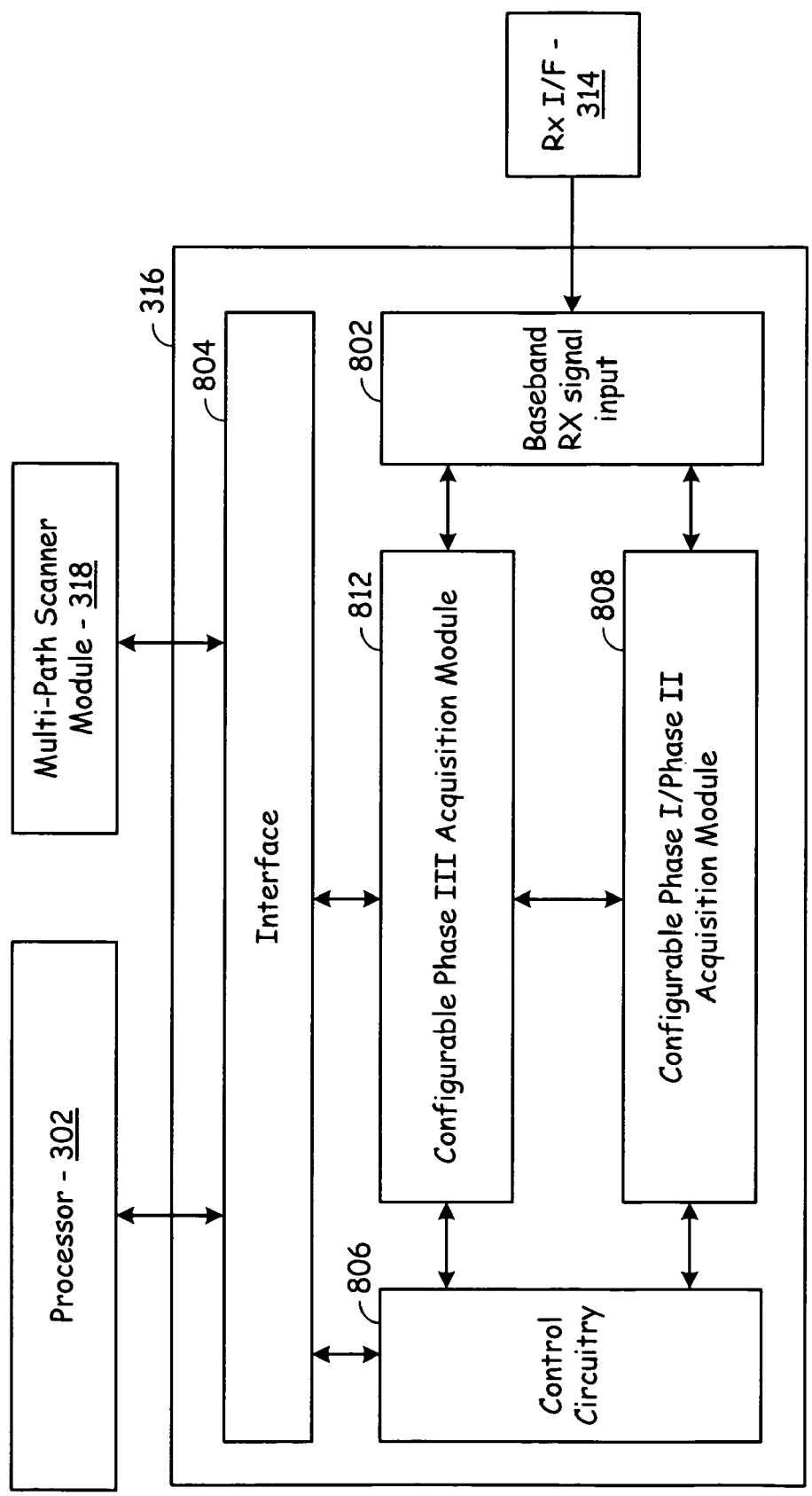
FIG. 8 is a block diagram illustrating a second embodiment of a cell searcher module according to an embodiment of the present invention.

FIG. 8 is a block diagram illustrating a second embodiment of a cell searcher module 316 according to an embodiment of the present. The alternative structure of the cell searcher module 316 of FIG. 8 includes an interface 804, a baseband RX signal input 802, control circuitry 806, a configurable Phase I/Phase II acquisition module 808, and a configurable Phase III acquisition module 812. . . . The baseband RX signal input 802 couples to RX interface 314 while the interface 804 couples to processor 302 and to multi-path scanner module 318.

As contrasted to the structure of FIG. 7, the cell searcher module 316 of FIG. 8 includes the configurable Phase I/Phase II acquisition module 808. The configurable Phase I/Phase II acquisition module 808 is operable to acquire slot synchronization to the received WCDMA signal based upon correlation with the PSCH of the WCDMA signal when in a first configuration. Further, the configurable Phase I/Phase II acquisition module 808 is operable to acquire frame synchronization to, and identify the code group of, the received WCDMA signal based upon correlation with the SSCH of the WCDMA signal when in a second configuration. The structure and operation of the configurable Phase I/Phase II acquisition module 808 will be described further with reference to FIGS. 10-14. The configurable Phase III acquisition module 812 of the cell searcher module 316 is operable to identify the scrambling code of the WCDMA signal based upon correlation of the CPICH of the WCDMA signal.

As will be further described herein, the configurable Phase I acquisition module 708, the configurable Phase II acquisition module 710, and the configurable Phase III acquisition module 712 of FIG. 7 as well as the configurable Phase I/Phase II acquisition module 808 and the configurable Phase III acquisition module 812 of FIG. 8 may be configured for. The various manners in which these modules may be configured will be described further not only in FIGS. 10-18 but their various operations described with reference to FIG. 9.

Figure 9:
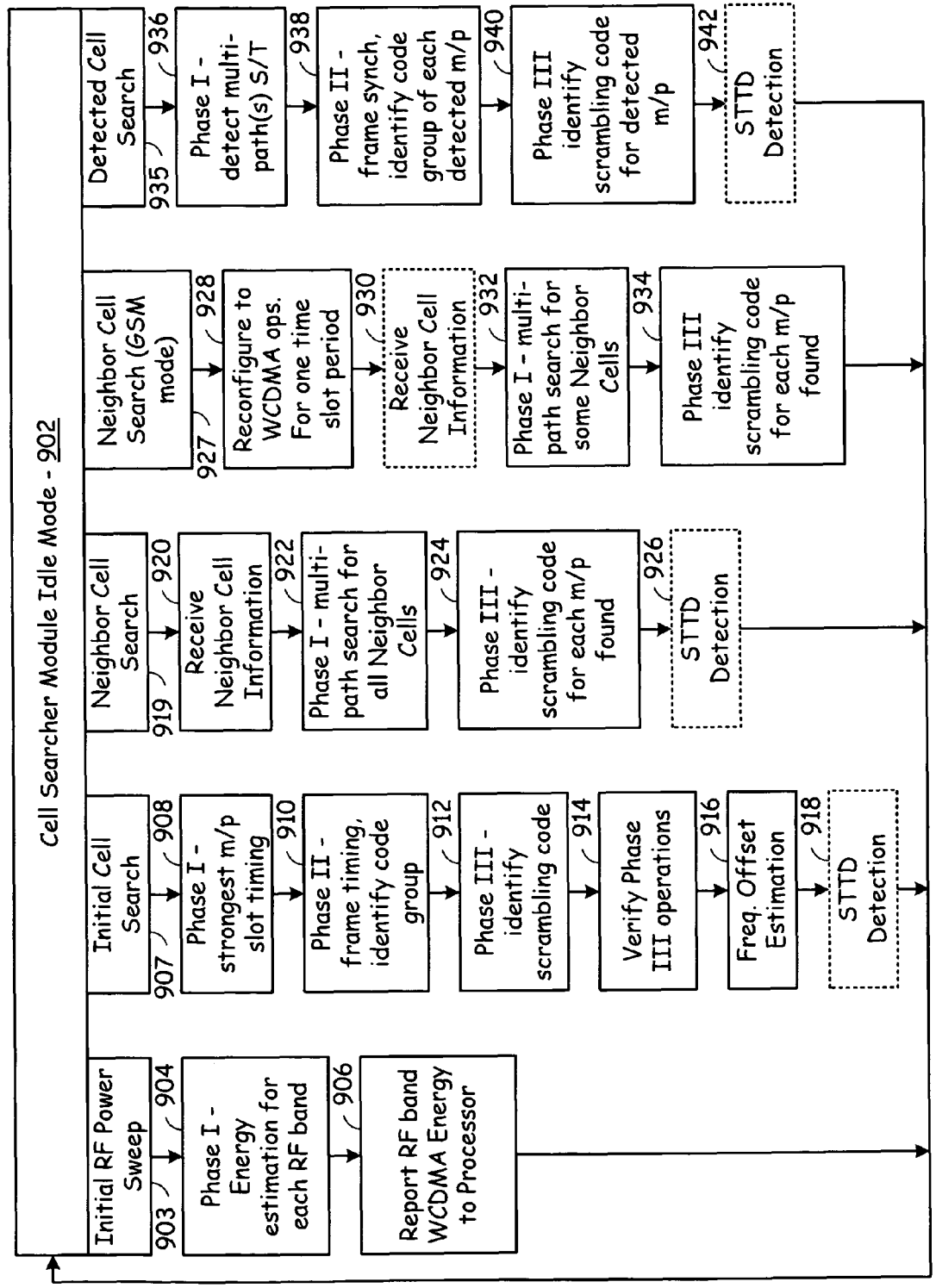
FIG. 9 is a flow chart illustrating operation of the cell searcher module(s) of FIG. 7 and/or FIG. 8 according to embodiments of the present invention.

FIG. 9 is a flow chart illustrating operation of the cell searcher module 316(*s*) of FIG. 7 and/or FIG. 8 according to embodiments of the present invention. The cell searcher module 316 resides in an idle mode when not performing its particular operations (Step 902). In a first set of operations, the cell searcher module 316 performs an initial RF power sweep (Step 903). During the initial RF power sweep operations, the Phase I acquisition module of the cell searcher module 316 may perform energy estimation based on the Phase I correlation results within each RF band scanned (Step 904). Alternatively, the cell searcher module 316, in conjunction with the RF front end of the radio 204 simply looks at the energy detected within each WCDMA RF band. When these operations are complete, the cell searcher module 316 reports WCDMA RF carrier energy to the coupled processor 302. Such reporting enables an upper layer protocol operation of the processor 302 to determine which RF carrier it should use to perform initial cell search operations.

Upon initiation of initial cell search operations (step 907), the Phase I acquisition module 708 of the cell searcher module 316 of FIG. 7 or the configurable Phase I/Phase II acquisition module 808 of FIG. 8 is configured to perform initial cell search Phase I operations. Upon such configuration, the configurable Phase I acquisition module 708 or the configurable Phase I/Phase II acquisition module 808 performs initial cell search Phase I operations to acquire slot synchronization to the received WCDMA signal based upon correlation with the PSCH of the WCDMA signal.

Then, initial cell search Phase II operations are performed to acquire frame synchronization and code group identification of the WCDMA signal (Step 910). The Phase II operations are performed by the configurable Phase II acquisition module 710 of the cell searcher module 316 of FIG. 7 or by the configurable Phase I/Phase II acquisition module 808 of the cell searcher module 316 of FIG. 8, configured to perform Phase II. After slot synchronization, frame synchronization, and code group identification has been performed, the cell searcher module 316 identifies the scrambling code of this WCDMA signal via correlation with the CPICH (Step 912). In performing the Phase III operations, the configurable Phase III acquisition module 712 of FIG. 7 or the configurable Phase III acquisition module 812 of FIG. 8 is configured to perform initial cell search Phase III operations. Then, the cell searcher module 316 verifies the Phase III operations (Step 914), performs frequency offset estimation (Step 916), and may perform Space Time Transmit Diversity (STTD) detection (Step 918). From Step 918, operation proceeds to Step 902 as it did from Step 906.

In another operation, the cell searcher module 316 initiates neighbor cell search operations (Step 919). Initiation of the neighbor cell search modules would typically be performed by the processor 302 after initial cell search operations have been successfully performed. As is known, in WCDMA systems, a neighbor cell/sector may have differing slot and frame timings than a serving cell/sector. Information regarding the code group and relative slot and frame timing of neighboring cells may be received by the RF transceiver (Step 920). This information would be contained in control transmissions received from the serving cell. Based upon the received information, the processor 302 directs the cell searcher module 316 to search for multi-path components of all neighbor cells in Phase I operations (Step 922). These Phase I operations may be performed by the configurable Phase I acquisition module 708 of FIG. 7 or the configurable Phase I/Phase II acquisition module 808 of FIG. 8, in a neighbor cell search Phase I configuration. The neighbor cell Phase I configuration differs from the initial cell search Phase I configuration. Once the Phase I operations have been successfully completed, the cell searcher module 316 performs Phase III operations to identify the scrambling code for each multi-path component of the neighbor cell WCDMA signal found in the Phase I operations (Step 924). Then, the cell searcher module 316 optionally performs STTD detection for the neighbor cell/sectors (Step 926).

In an alternate operation according to the present invention, the RF transceiver may operate in a GSM mode in communicating with a serving cell. Operations in establishing communication with a serving cell/sector in GSM mode are not described herein except as they relate to the present invention. When the neighbor cell search (GSM mode) operations of Step 927 are initiated, the RF terminal must reconfigure itself to perform the neighbor cell search while still supporting GSM operations. The cell searcher module 316 is reconfigured or configured for WCDMA operations for only one time slot, for example (Step 928). Because this slot period of time is relatively short, operations are expedited and the number of correlations that may be performed in the neighbor cell search is limited. In some operations, neighbor cell search information will be received by the servicing GSM cell (Step 930). Based on this information then, the cell searcher module 316 performs Phase I operations to search for multi-path components of neighboring cell/sectors (Step 932). Then, the cell searcher module 316 performs Phase III operations to identify the scrambling code for each multi-path component of the neighboring cell/sectors that were found (Step 934).

In another operation, the cell searcher module 316 performs detected cell search operations (Step 935). These operations are similar to the initial cell search operations of Steps 907-918. In such case, the cell searcher module 316 performs Phase I operations to detect multi-path slot timing for detected cell/sector transmissions (Step 936). The cell searcher module 316 then performs Phase II frame synchronization and code group identification operations for each of the detected multi-path signal components (Step 938). Then, the cell searcher module 316 performs Phase III operations to identify the scrambling code for each detected multi-path signal component (Step 940). Then, the cell searcher module 316 optionally performs STTD detection (Step 942). Operation from Steps 926, 934 and 942 return to Step 902.

Figure 10:
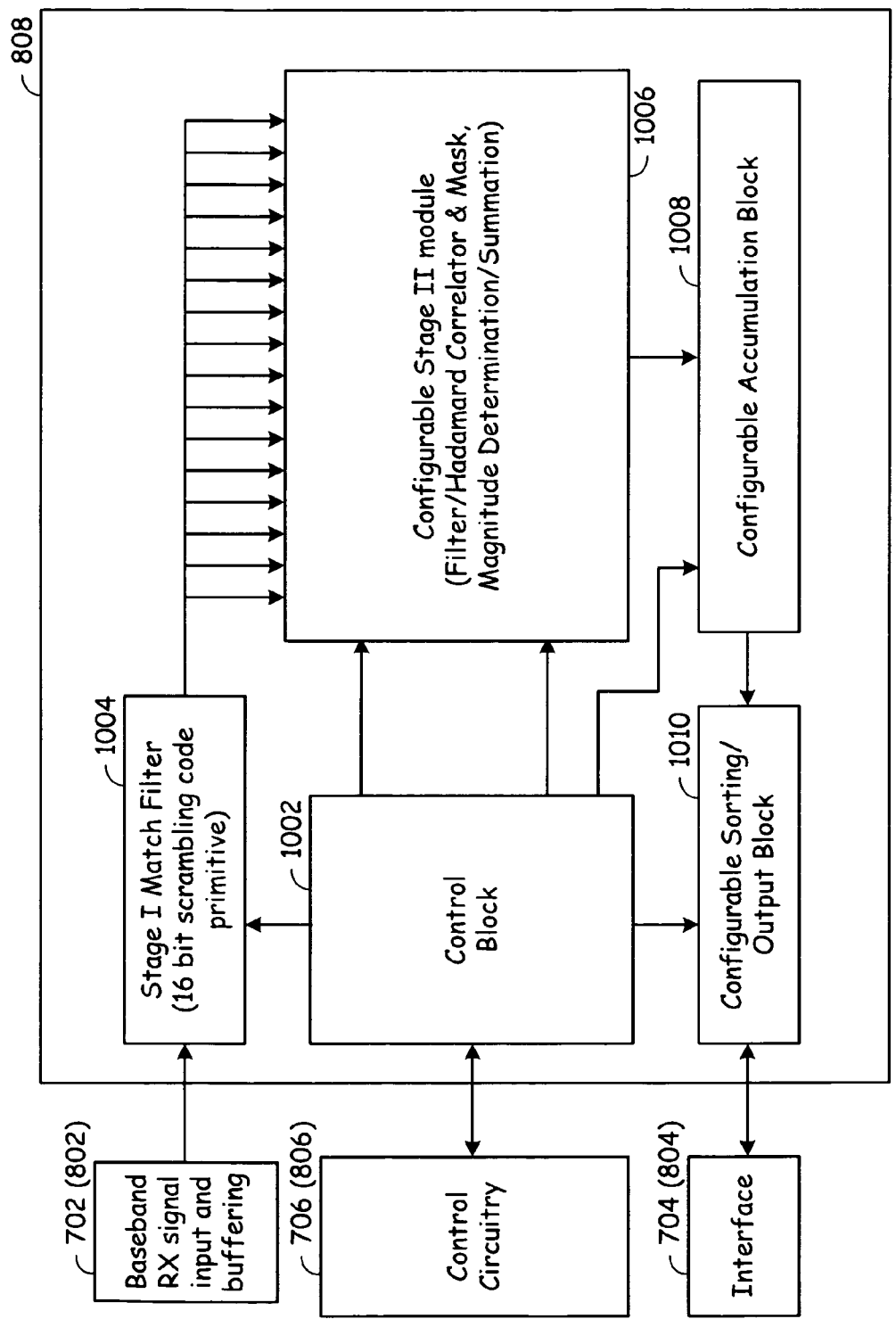
FIG. 10 is a block diagram illustrating a configurable phase I/phase II acquisition module of the cell searcher module of the present invention.

FIG. 10 is a block diagram illustrating a configurable Phase I/Phase II acquisition module of the cell searcher module 316 of the present invention. The configurable Phase I/Phase II acquisition module 808 of FIG. 10 was previously introduced as element 808 of FIG. 8. The configurable Phase I/Phase II acquisition module 808 of structure of FIG. 10 may be configured in an initial cell search Phase I configuration, a neighbor cell search Phase I configuration, an initial cell search Phase II configuration, or a neighbor cell search Phase II configuration. These configurations are described further with reference to FIGS. 11, 12, 13, and 14, respectively. Note that the configurations for initial cell search and detected cell search operations are same/similar. Further, note that the configurable Phase I acquisition module 708 and the configurable Phase II acquisition module 710 of FIG. 7 may have structures similar to that of the Phase I/Phase II acquisition module 808.

The configurable Phase I/Phase II acquisition module 808 includes a control block 1002, a stage I match filter 1004, a configurable stage II module 1006, a configurable accumulation block 1008, and a configurable sorting/output block 1010. The stage I match filter 1004 receives WCDMA signal samples from baseband RX signal input and buffering block 702 (802). The stage I match filter 1004 correlates a 16 bit scrambling code primitive to the baseband RX signal samples as they are received and produces multiple, e.g., 16, correlation outputs to the configurable stage II module 1006. Depending upon how it is configured (Phase I or Phase II operations), the configurable stage II module 1006 performs filtering operations, Hadamard correlation and mask operations, magnitude determination operations, and/or summation operations. The output produced by the configurable stage II module is received by the configurable accumulation block 1008 where accumulation is performed. The output of configurable accumulation block 1008 is produced to configurable sorting/output block 1010. Control block 1002 controls the operation of the stage I match filter 1004, the configurable stage II module 1006, the configurable accumulation block 1008, and the configurable sorting/output block 1010. Control block 1002 interfaces with control circuitry 706 (806). Configurable sorting/output block 1010 couples to interface 704 (804). As will be further described with reference to FIGS. 11-14, the configurable Phase I acquisition module 708, the configurable Phase II acquisition module 710, and the configurable Phase I/Phase II acquisition module 808 may be configured and reconfigured to perform various acquisition aspects of the of Phase I operations and the Phase II operations.

Figure 11:
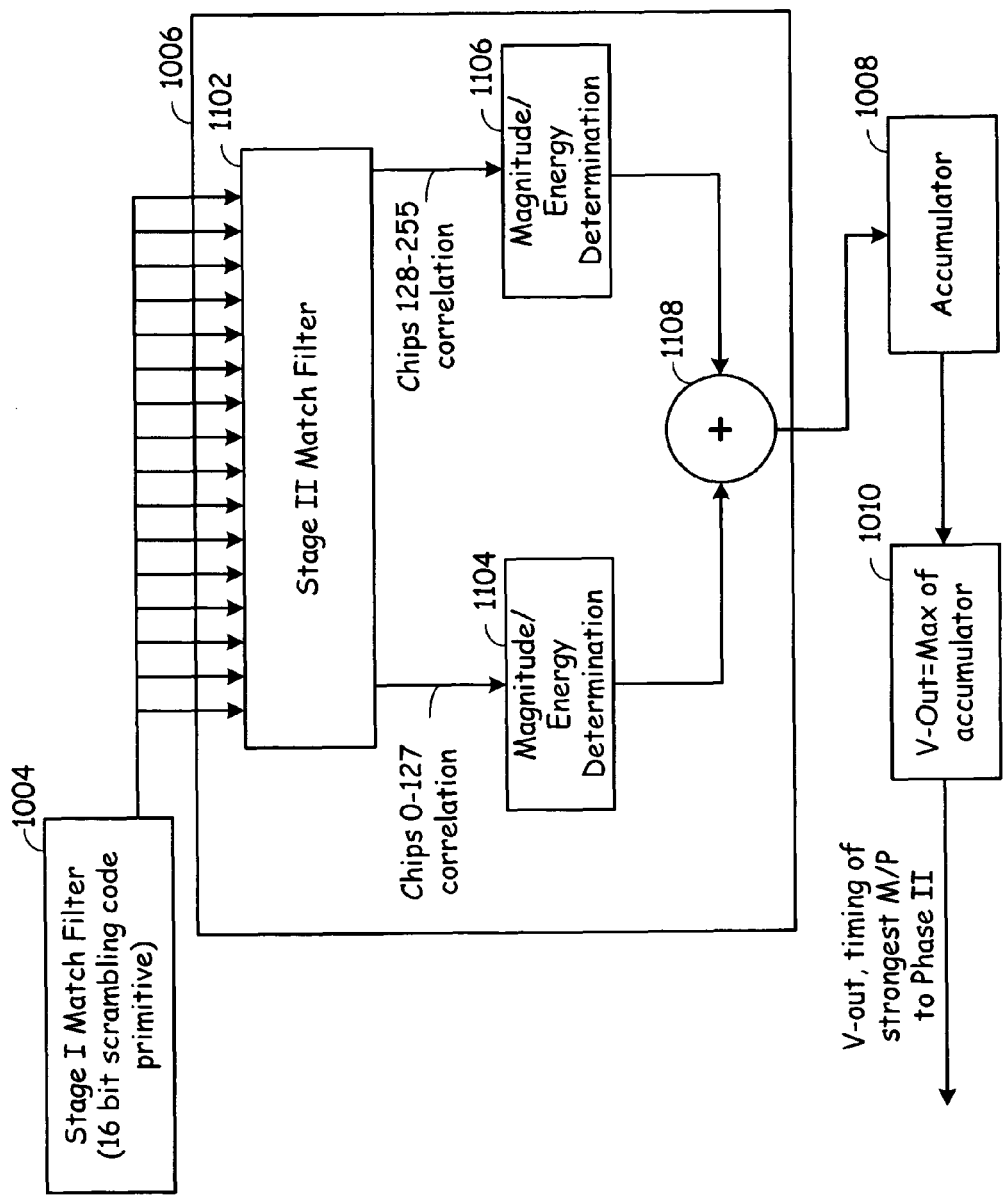
FIG. 11 is a block diagram illustrating an acquisition module of the cell searcher module of the present invention operable to perform phase I initial cell search operations.

FIG. 11 is a block diagram illustrating an acquisition module of the cell searcher module 316 of the present invention operable to perform Phase I initial cell search operations. The acquisition module of FIG. 11 may be the Phase I acquisition module 708 of FIG. 7 or the Phase I/Phase II configurable acquisition module 808 of FIG. 8 configured to acquire slot synchronization to the received WCDMA signal based upon correlation with the PSCH of the WCDMA signal. With the configuration of FIG. 11, the stage II module 1006 is configured to include a stage II match filter 1102, a first magnitude/energy determination block 1104, and a second magnitude/energy determination block 1106. The first magnitude/energy determination block 1104 receives correlations relating to chips 0-127 and the second magnitude/energy determination block 1106 receives information regarding correlation of chips 128-256, these correlations produced by the Stage II match filer 1102. Magnitude/energy determination blocks 1104 and 1106 determine the magnitude or energy, or approximation thereof of their respective inputs. Summing block 1108 receives the magnitude determinations from first magnitude/energy determination block 1104 and second magnitude/energy determination block 1106, sums the outputs, and outputs the sum to accumulator 1008. With these Phase I initial cell search operations, the configurable sorting/output block 1010 is configured to produce a maximum v-out as was stored in accumulator 1008.

The configurable sorting/output block 1010 is configured to determine the maximum Voltage (V-Out) indicated by the accumulator 1008 contents and to provide the magnitude and the timing of the corresponding element as its output. Such information corresponds to the strongest multi-path component of the WCDMA signal as determined in the slot synchronization of the Phase I operations of the configurable Phase I acquisition module 708 or the configurable Phase I/Phase II acquisition module 808. This information is provided to either the configurable Phase II acquisition module 710 or to the configurable Phase I/Phase II acquisition module 808 in a second configuration in which it performs initial cell search Phase II operations.

Figure 12:
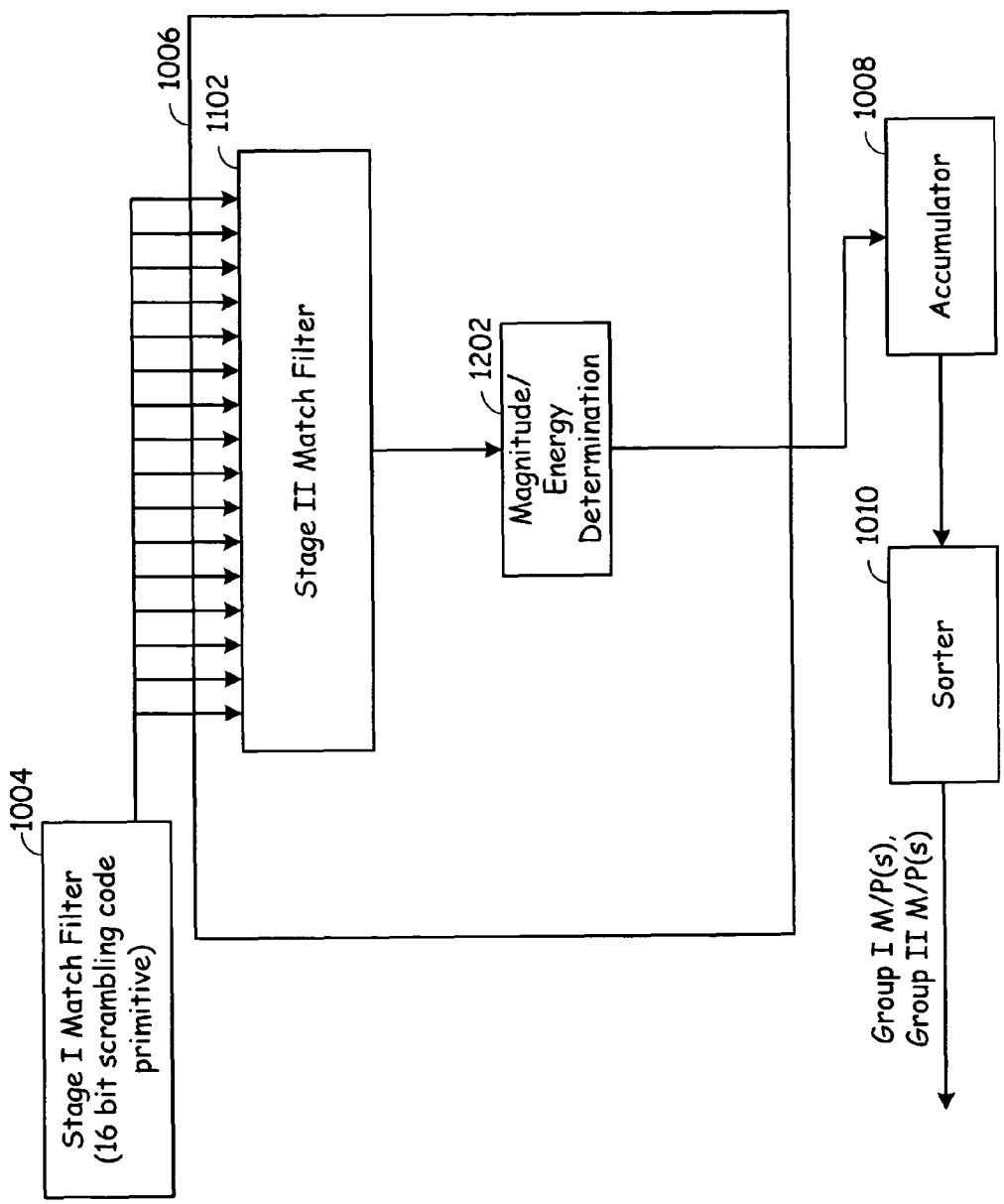
FIG. 12 is a block diagram illustrating an acquisition module of the cell searcher module of the present invention operable to perform neighbor cell search phase I operations and detected cell search phase I operations.

FIG. 12 is a block diagram illustrating an acquisition module of the cell searcher module of the present invention operable to perform neighbor cell search phase I operations and detected cell search phase I operations. The acquisition module of FIG. 12 may be the configurable Phase I acquisition module 708 or the configurable Phase I/Phase II acquisition module 808 in a second configuration in which the acquisition module performs neighbor cell search Phase I operations and detected cell search Phase I operations. The stage I match filter 1004 performs correlation of input samples of the WCDMA signal with a 16 bit scrambling code primitive and produces a plurality of outputs. The plurality of outputs is received by a stage II match filter 1102 of the configurable stage II 1006. The output of the stage II match filter 1102 is received by magnitude/energy determination block 1202, the output of which is provided to accumulator 1008. The configurable sorting/output block 1010 is configured to determine a plurality of multi-path components and to output these multi-path components. In one particular operation, the sorting/output block 1010 outputs a plurality of Group I multi-path components corresponding to a strongest signal and a plurality of Group II multi-path components corresponding to weaker signals.

Figure 13:
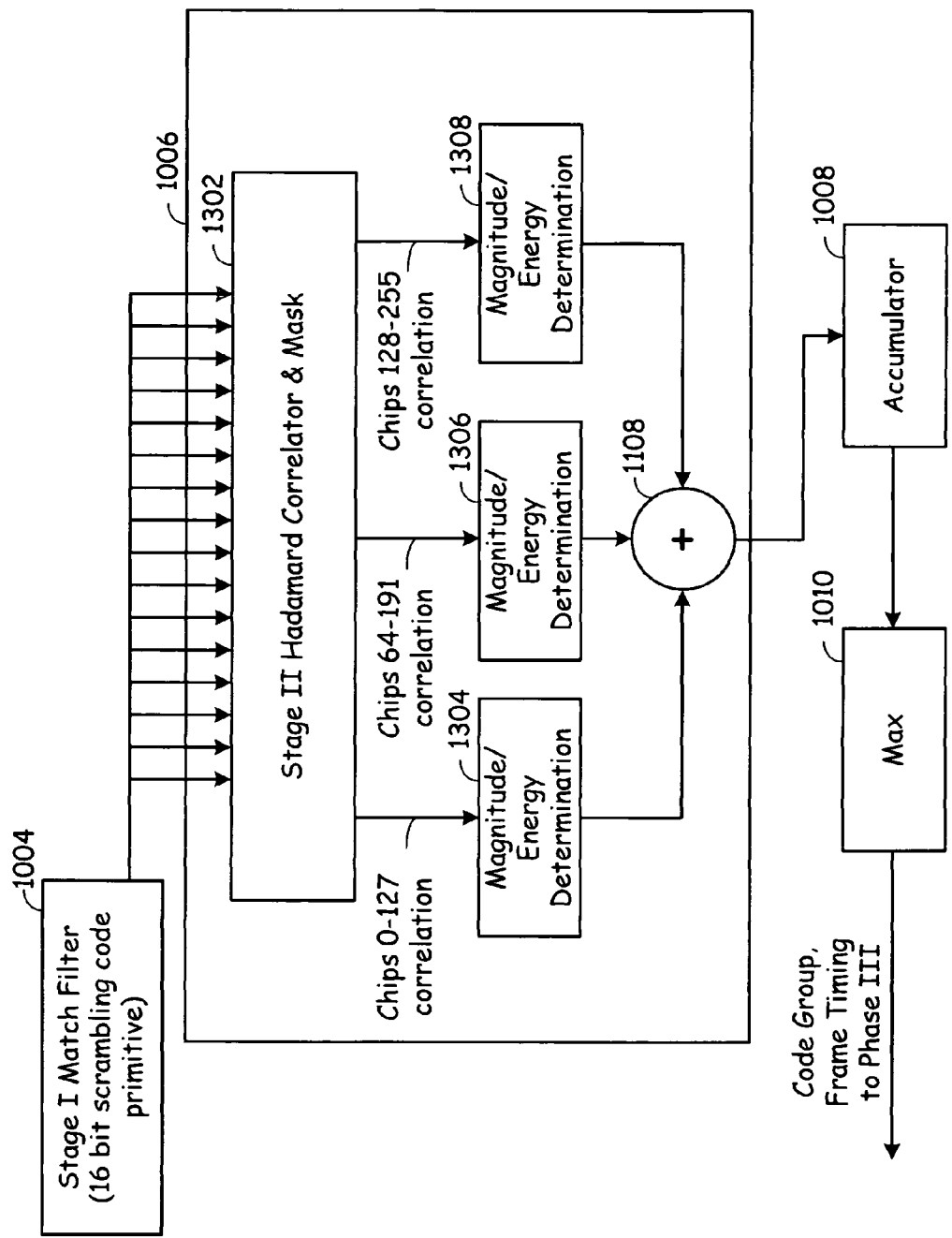
FIG. 13 is a block diagram illustrating an acquisition module of the cell searcher module of the present invention operable to perform initial cell search phase II operations.

FIG. 13 is a block diagram illustrating an acquisition module of the cell searcher module 316 of the present invention operable to perform initial cell search Phase II operations. The acquisition module of FIG. 13 may be the configurable stage II acquisition module 710 of FIG. 7 or the configurable Phase I/Phase II acquisition module 808 of FIG. 8, in the corresponding configuration. In such configuration, the acquisition module includes a stage I match filter 1004 that correlates a 16 bit scrambling code primitive with incoming baseband samples to produce multiple outputs to a stage II Hadamard correlator and mask 1302. The of the stage II Hadamard correlator and mask 1302 performs Hadamard correlation operations and masking operations to produce outputs to magnitude/energy determination blocks 1304, 1306, and 1308. Magnitude/energy determination block 1304 operates upon correlations relating to chips 0-127 correlation, magnitude/energy determination block 1306 operates upon correlations relating to chips 64-191 correlation, and magnitude/energy determination block 1308 operates upon correlations relating to chips 128-256. Summing module 1108 receives the outputs from the magnitude/energy determination blocks 1304, 1306, and 1308 and produces an output to accumulator, which receives the summed result produced by summing block 1108. In the configuration of FIG. 13, the configurable sorting/output block 1010 is configured to produce or to determine the maximum value in accumulator 1008. Such maximum value yields the code group and the frame timing of the strongest WCDMA signal operated upon by the Phase II operations. This information is provided to the Phase III acquisition modules 712 or 812 for further use in determining the scrambling code of the WCDMA signal.

Figure 14:
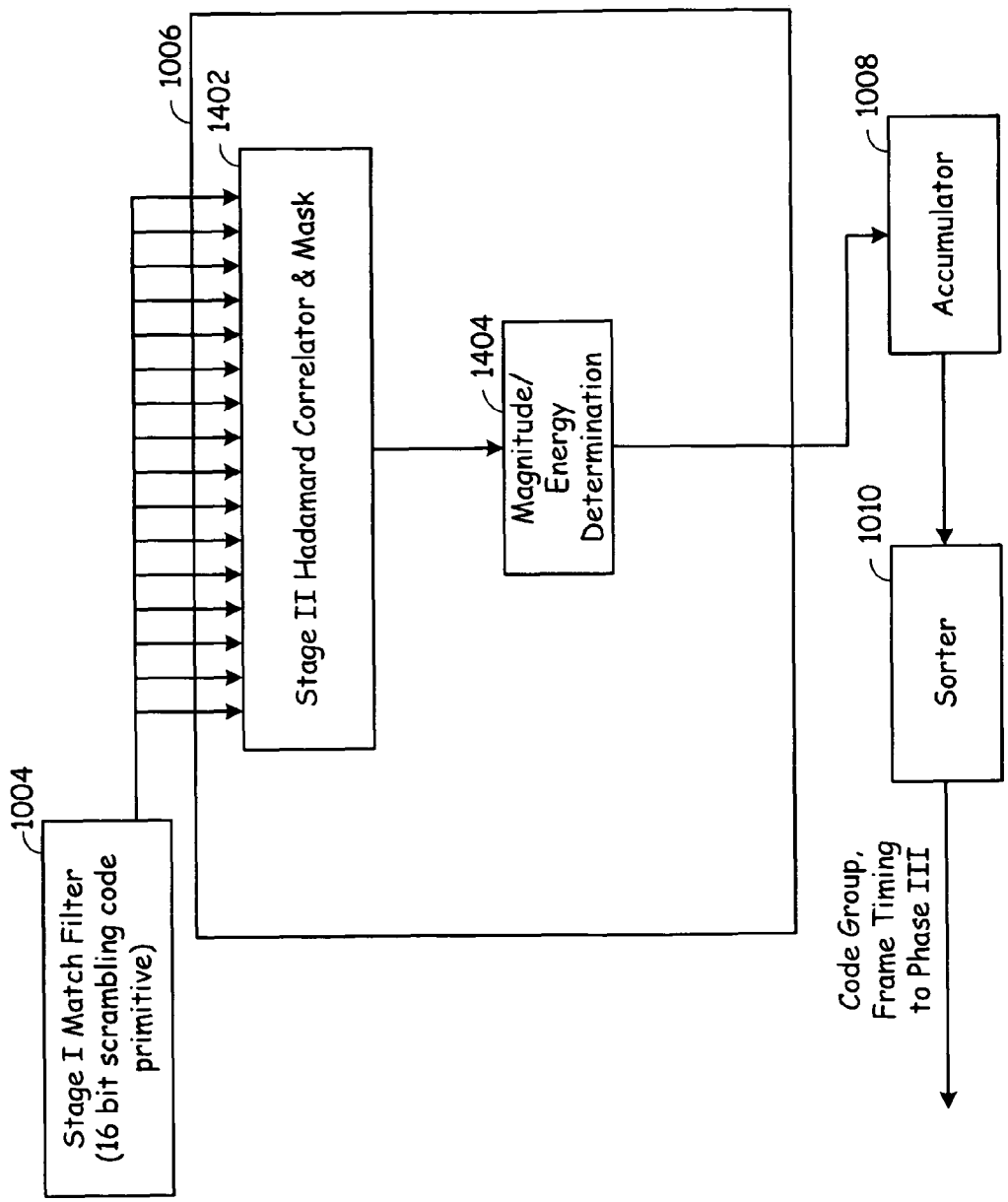
FIG. 14 is a block diagram illustrating an acquisition module of the cell searcher module of the present invention operable to perform detected cell search phase II operations.

FIG. 14 is a block diagram illustrating an acquisition module of the cell searcher module 316 of the present invention operable to perform detected cell search Phase II operations. The acquisition module of FIG. 14 may be the configurable stage II acquisition module 710 or the configurable Phase I/Phase II acquisition module 808 as configured to perform detected cell search Phase II operations. In this configuration, stage I match filter 1004 receives the WCDMA signals and correlates the WCDMA signal with the 16 bit scrambling code primitive 1004 and produces a plurality of outputs. The plurality of outputs are received by stage II Hadamard correlator and mask 1402, which performs Hadamard correlation operations and masking operations. The results produced by stage II Hadamard correlator and mask 1402 are received by magnitude/energy determination block 1404 which determines the magnitude of the results. Accumulator 1008 receives the results produced by the magnitude/energy determination block 1404. With the configuration of FIG. 14, the configurable sorting/output block 1010 is configured as a sorter with the output produced by sorter 1010 being the code group and frame timing of the detected cell transmissions that were found.

Figure 15:
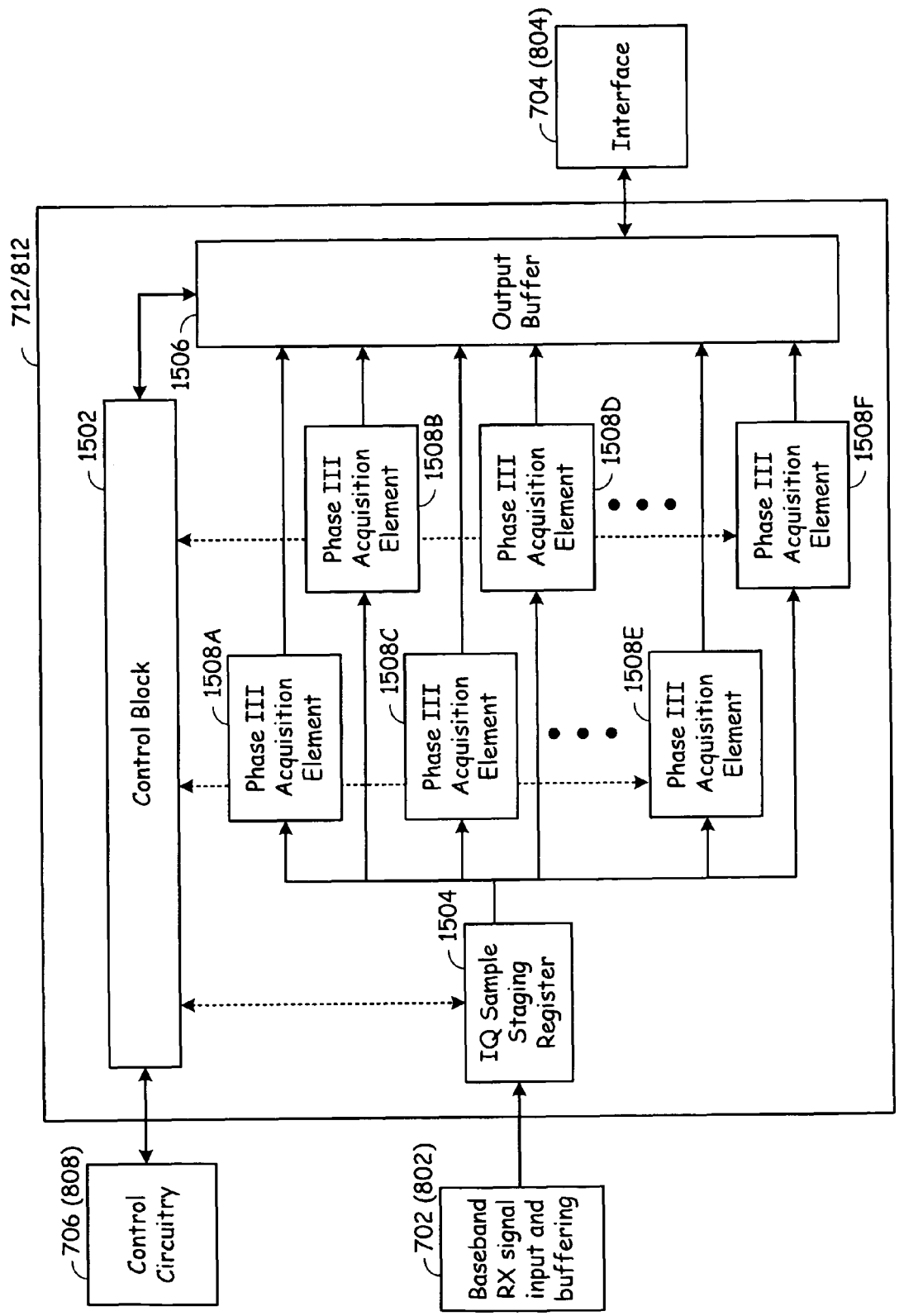
FIG. 15 is block diagram illustrating a first embodiment of a configurable phase III acquisition module of the cell searcher module of the present invention.

FIG. 15 is block diagram illustrating a first embodiment of a configurable Phase III acquisition module of the cell searcher module 316 of the present invention. The configurable Phase III acquisition module 712/812 includes a control block 1502, and IQ sample staging register 1504, an output buffer 1506, and a plurality of Phase III acquisition elements 1508A-1508F. Control block 1502 couples to the control circuitry 706/806. Output buffer 1506 couples to interface 704/804. IQ sample staging register 1504 couples to baseband RX signal input and buffering block 702/802. Control block 1502 controls the operation of each of the other components within the configurable Phase III acquisition modules 712-812.

As was previously described with reference to FIGS. 9-14, in various acquisition operations, multiple hypothesis retarding multi-path signal component slot timing, frame timing, and other information may be produced to the configurable Phase III acquisition module 712/812. For each hypothesis provided, the Phase III acquisition module attempts to determine a corresponding scrambling code. Thus, each of the Phase III acquisition elements 1508A-1508F may correlate to a unique multi-path component in the attempt to determine a corresponding scrambling code for the multi-path component.

Figure 16:
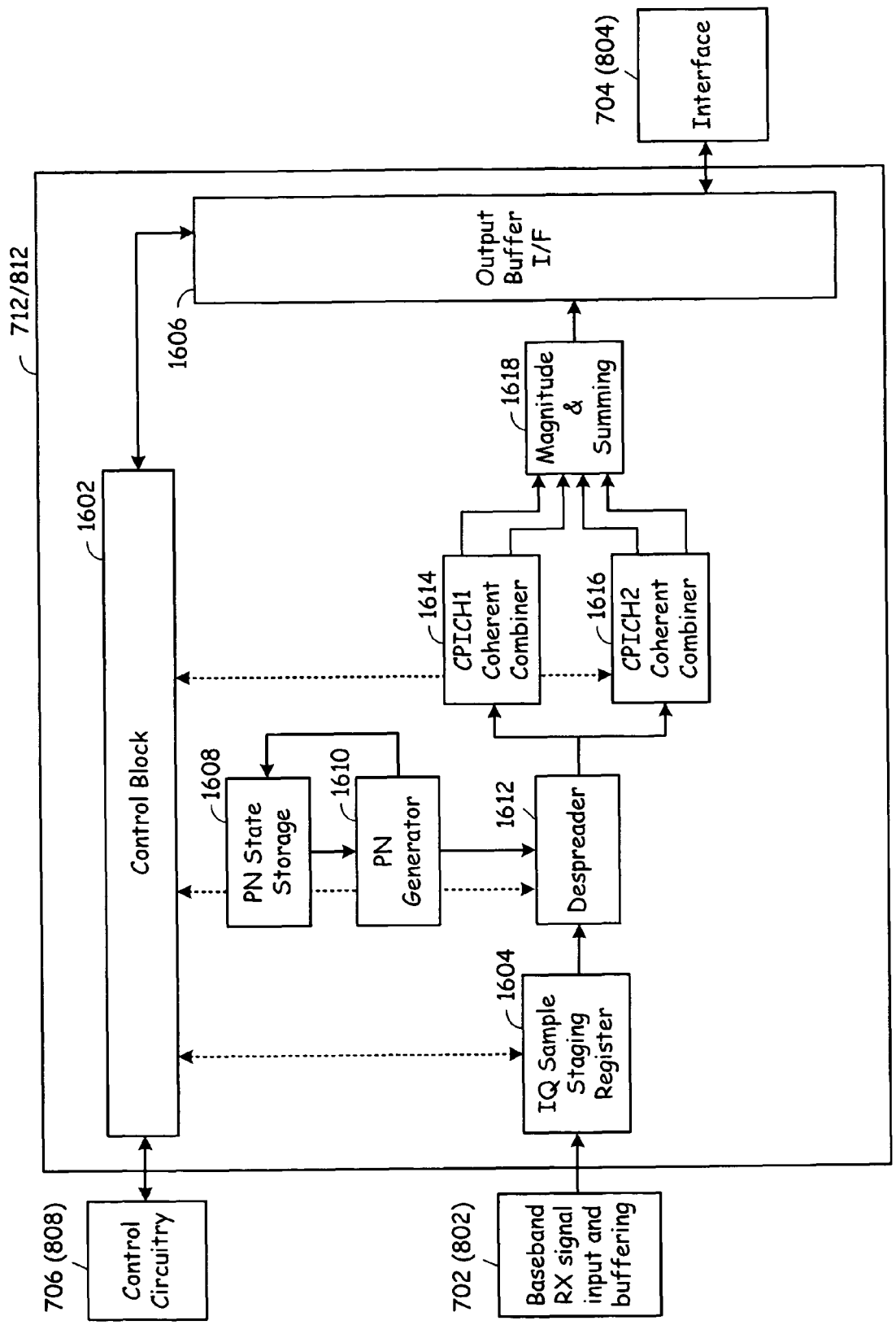
FIG. 16 is block diagram illustrating a second embodiment of a configurable phase III acquisition module of the cell searcher module of the present invention.

FIG. 16 is block diagram illustrating a second embodiment of a configurable Phase III acquisition module of the cell searcher module 316 of the present invention. The second embodiment of the configurable Phase III acquisition module 712/812 includes control block 1602, output buffer 1606, IQ sample staging register 1604, PN state storage 1608, PN generation 1610, despreader 1612, CPICH1 coherent combiner 1614, CPICH2 coherent combiner 1616, and magnitude and summing block 1608. Control block 1602 couples to control circuitry 706/808. IQ sample staging register 1604 couples to baseband RX signal input and buffering block 702/802 and receives samples therefrom. Output buffer interface 1606 produces output to interface 704/804. With the structure of FIG. 16 is contrasted to the structure of FIG. 15, a plurality of parallel Phase III acquisition elements is not employed. Alternatively, the structure of FIG. 16 may be contained within each of the Phase III acquisition elements 1508A-1508F of FIG. 15. Thus, the limitation and structure of FIG. 16 do not limit the scope of the Phase III acquisition module of the present invention.

Figure 17:
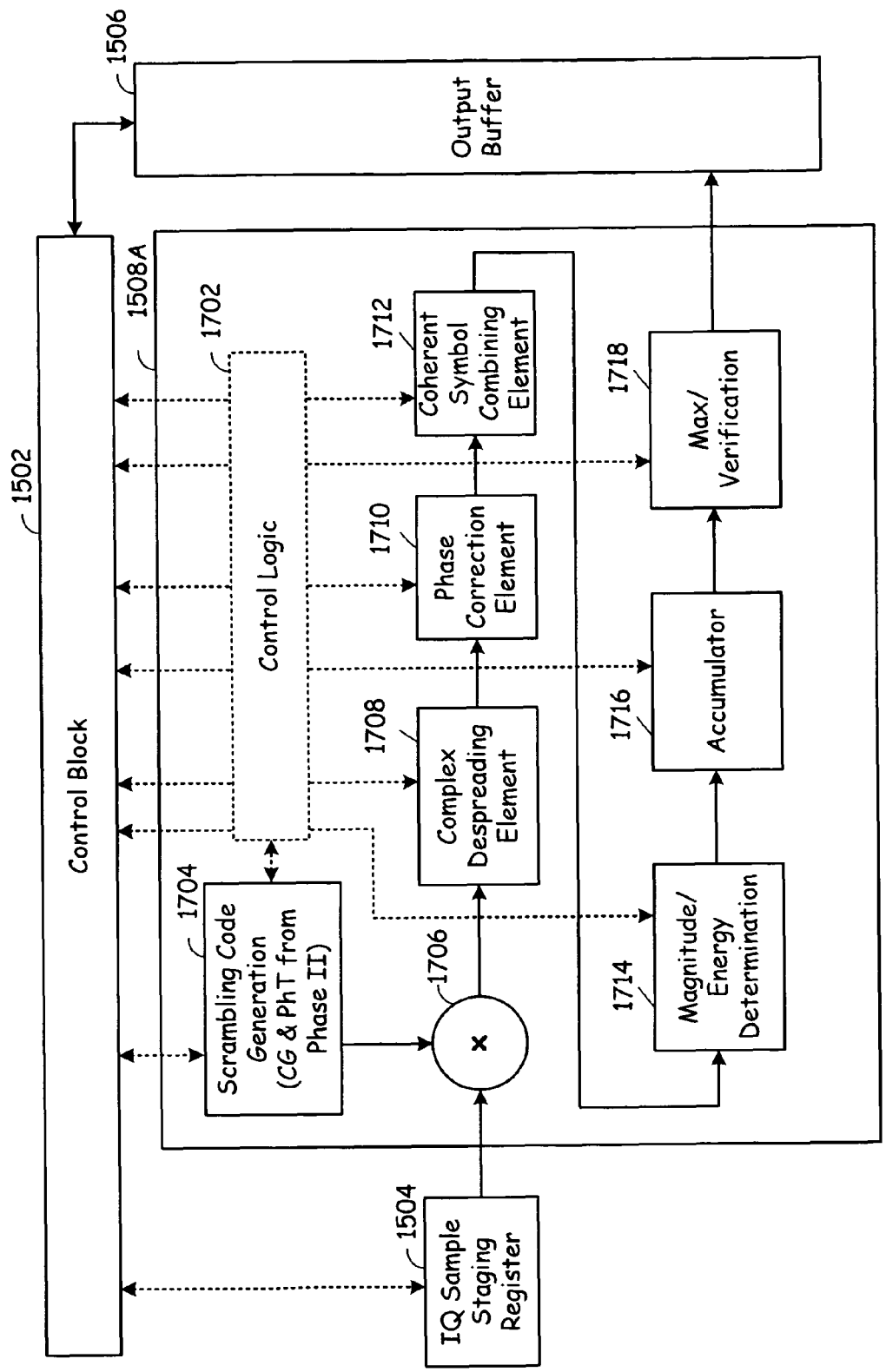
FIG. 17 is a block diagram illustrating an acquisition element of the configurable phase III acquisition module of the cell searcher module of the present invention operable to perform initial cell search phase III operations.

FIG. 17 is a block diagram illustrating an acquisition element of the configurable Phase III acquisition module of the cell searcher module 316 of the present invention operable to perform initial cell search Phase III operations. The acquisition element 1508A is configured to perform Phase III initial cell search operations. In such case, the acquisition element 1508A includes scrambling code generation 1704, control logic 1702, multiplier element 1706, complex despreading element 1708, phase correction element 1710, coherent symbol combining element 1712, magnitude/energy determination block 1714, accumulator 1716, and max/verification block 1718. Control block 1502 controls the elements of the acquisition element 1508A. Alternatively, control logic 1702 controls the components of the acquisition element 1508A and interfaces with control block 1502.

Figure 18:
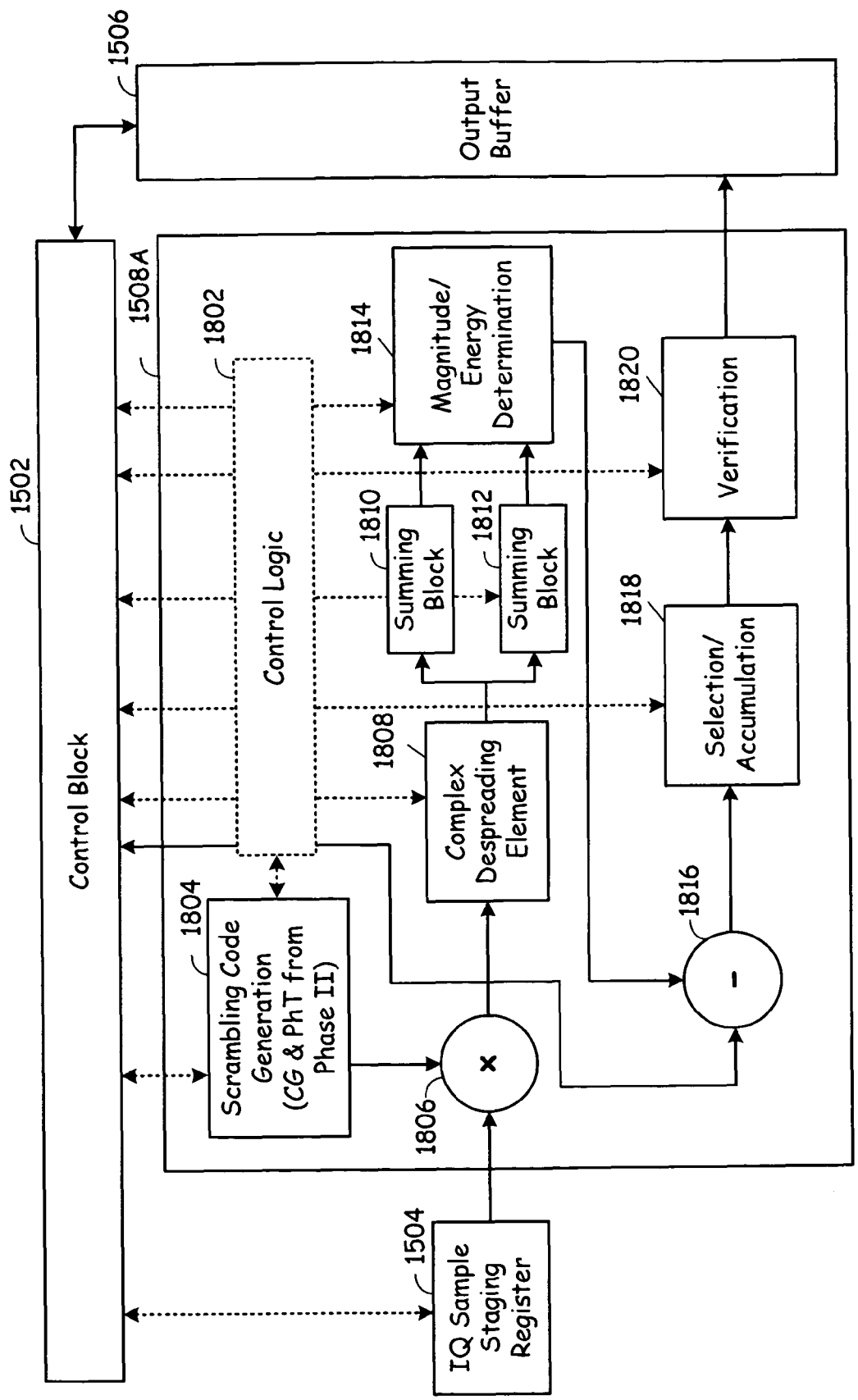
FIG. 18 is a block diagram illustrating an acquisition element of the configurable phase III acquisition module of the cell searcher module of the present invention operable to perform neighbor cell search phase III and detected cell search Phase III operations.

FIG. 18 is a block diagram illustrating an acquisition element of the configurable phase III acquisition module of the cell searcher module of the present invention operable to perform neighbor cell search phase III and detected cell search Phase III operations. The acquisition element 1508 is configured to include control logic 1802, scrambling code generation block 1804, multiplier 1806, complex despreading element 1808, summing blocks 1810 and 1812, magnitude/energy determination block 1814, subtraction block 1816, selection/accumulation block 1818, and verification block 1820. In this configuration of FIG. 18, the acquisition element 1508A receives timing information for a particular multi-path component of the WCDMA signal for which it will acquire a scrambling code. Of course as was previously determined, the scrambling code is one of a number of available scrambling codes within the identified code group of the WCDMA signal.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

The invention claimed is:

1. A baseband processing module for use within a Wideband Code Division Multiple Access (WCDMA) Radio Frequency (RF) transceiver, the baseband processing module comprising:

TX processing components communicatively coupled to an RF front end of the RF transceiver and operable to receive outbound data, to process the outbound data to produce a baseband TX signal, and to output the baseband TX signal to the RF front end of the RF transceiver;

a processor;

memory communicatively coupled to the processor;

an RX interface communicatively coupled to the RF front end of the WCDMA RF transceiver and operable to receive a baseband RX signal from the RF front end carrying a WCDMA signal; and a cell searcher module communicatively coupled to the processor and to the RX interface, the cell searcher module operable to:

receive the baseband RX signal;

scan for WCDMA energy within the baseband RX signal;

acquire slot synchronization to the WCDMA signal based upon correlation with a Primary Synchronization Channel (PSCH) of the WCDMA signal using a phase I acquisition module;

acquire frame synchronization to, and identify a code group of, the WCDMA signal based upon correlation with a Secondary Synchronization Channel (SSCH) of the WCDMA signal using a phase II acquisition module that is separate and distinct from the phase I acquisition module;

acquire frame synchronization to, and identify the code groups of, a plurality of WCDMA signals of a plurality of neighbor cells bases upon correlation with the SSCH of the WCMDA signals using the phase II acquisition module; and identify the scrambling code of the WCDMA signal based upon correlation with a Common Pilot Channel (CPICH) of the WCDMA signal using a phase III acquisition module that is separate and distinct from both the phase I and phase II acquisition modules.

2. The baseband processing module of claim 1, wherein the cell searcher module is further operable to estimate a signal to interference ratio of the WCDMA signal based upon the correlation with the CPICH of the WCDMA signal.

3. The baseband processing module of claim 1, wherein the cell searcher module is further operable to estimate a frequency offset between the RF transceiver and an RF transmitter based upon correlation with the CPICH of the WCDMA signal.

4. The baseband processing module of claim 1, wherein the cell searcher module is further operable to:
receive information regarding a neighbor cell from the communicatively coupled processor, including timing offset information and a code group of the neighbor cell;
acquire slot synchronization with a WCDMA signal of the neighbor cell based upon correlation with a PSCH of the WCDMA signal of the neighbor cell; and
identify the scrambling code and frame boundary of the WCDMA signal of the neighbor cell based upon correlation with a CPICH of the WCDMA signal of the neighbor cell.

5. The baseband processing module of claim 1, wherein:
the phase I acquisition module is further operable to acquire multipath timing information for the plurality of WCDMA signals of the plurality of neighbor cells based upon correlation with at least one PSCH of the plurality of WCDMA signals when in a third configuration;
the phase III acquisition module is further operable to identify scrambling code of the plurality of WCDMA signals of the plurality of neighbor cells based upon correlations with CPICHs of the plurality of WCDMA signals of the plurality of neighbor cells.

6. The baseband processing module of claim 1, further comprising:
a multi-path scanner module; and
a rake receiver combiner module.

7. A baseband processing module for use within a Wideband Code Division Multiple Access (WCDMA) Radio Frequency (RF) transceiver, the baseband processing module comprising:
TX processing components communicatively coupled to a RF front end of the RF transceiver and operable to receive outbound data, to process the outbound data to produce a baseband TX signal, and to output the baseband TX signal to the RF front end of the RF transceiver;
a processor;
memory communicatively coupled to the processor;
an RX interface communicatively coupled to the RF front end of the RF transceiver and operable to receive a baseband RX signal from the RF front end carrying a WCDMA signal; and
a cell searcher module communicatively coupled to the processor and to the RX interface, the cell searcher module comprising:
a phase I acquisition module that is operable to acquire slot synchronization to the WCDMA signal based upon correlation with a Primary Synchronization Channel (PSCH) of the WCDMA signal;
a phase II acquisition module that is operable to acquire frame synchronization to, and identify the code group of, the WCDMA signal based upon correlation with a Secondary Synchronization Channel (SSCH) of the WCDMA signal and that is further operable to acquire frame synchronization to, and identify the code groups of, a plurality of WCDMA signals of a plurality of neighbor cells based upon correlation with the SSCH of the WCDMA signals; and
a phase III acquisition module that is operable to identify the scrambling code of the WCDMA signal based upon correlation with a Common Pilot Channel (CPICH) of the WCDMA signal.

8. The baseband processing module of claim 7, wherein the cell searcher module is further operable to estimate a signal to interference ratio of the WCDMA signal based upon the correlation with the CPICH of the WCDMA signal.

9. The baseband processing module of claim 7, wherein the cell searcher module is further operable to estimate a frequency offset between the RF transceiver and an RF transmitter based upon correlation with the CPICH of the WCDMA signal.

10. The baseband processing module of claim 7, wherein the cell searcher module is further operable to:
receive information regarding at least one of the neighbor cells from the communicatively coupled processor, including timing offset information and a code group of that at least one of the neighbor cells;
acquire slot synchronization with a WCDMA signal of the neighbor cell based upon correlation with a PSCH of the WCDMA signal of that at least one of the neighbor cells; and
identify the scrambling code and frame boundary of the WCDMA signal of that at least one of the neighbor cells based upon correlation with a CPICH of the WCDMA signal of that at least one of the neighbor cells.

11. The baseband processing module of claim 7, wherein:
the phase I acquisition module is further operable to acquire multipath timing information for the plurality of WCDMA signals of the plurality of neighbor cells based upon correlation with at least one PSCH of the plurality of WCDMA signals when in a third configuration; and
the phase III acquisition module is further operable to identify the scrambling code of the plurality of WCDMA signals of the plurality of neighbor cells based upon correlations with CPICHs of the plurality of WCDMA signals of the plurality of neighbor cells.

12. The baseband processing module of claim 7, further comprising:
a multi-path scanner module; and
a rake receiver combiner module.

* * * * *

UNITED STATES PATENT AND TRADEMARK OFFICE
CERTIFICATE OF CORRECTION

| | | |
|---|---|---|
| PATENT NO. | : 7,894,508 B2 | Page 1 of 1 |
| APPLICATION NO. | : 11/221145 | |
| DATED | : February 22, 2011 | |
| INVENTOR(S) | : Mark David Hahm et al. | |

It is certified that error appears in the above-identified patent and that said Letters Patent is hereby corrected as shown below:

Col. 16, line 56, in claim 1: replace "bases" with --based--

Signed and Sealed this
Seventh Day of August, 2012

David J. Kappos
*Director of the United States Patent and Trademark Office*